US008757253B2

(12) United States Patent
Code

(10) Patent No.: US 8,757,253 B2
(45) Date of Patent: Jun. 24, 2014

(54) MODERATION OF OIL EXTRACTION WASTE ENVIRONMENTS

(75) Inventor: Kenneth R. Code, Edmonton (CA)

(73) Assignee: Biolargo Life Technologies, Inc., Irvine, CA (US)

( * ) Notice: Subject to any disclaimer, the term of this patent is extended or adjusted under 35 U.S.C. 154(b) by 391 days.

(21) Appl. No.: 13/116,775

(22) Filed: May 26, 2011

(65) Prior Publication Data

US 2011/0297381 A1 Dec. 8, 2011

Related U.S. Application Data

(63) Continuation-in-part of application No. 12/220,484, filed on Jul. 24, 2008, which is a continuation-in-part of application No. 11/516,960, filed on Sep. 7, 2006, now Pat. No. 7,867,510, and a continuation-in-part of application No. 11/516,958, filed on Sep. 7, 2006, now abandoned.

(60) Provisional application No. 61/378,227, filed on Aug. 30, 2010, provisional application No. 61/396,836, filed on Jun. 2, 2010, provisional application No. 60/961,903, filed on Jul. 25, 2007, provisional application No. 60/850,976, filed on Oct. 11, 2006.

(51) Int. Cl.
  *E21B 43/22* (2006.01)
(52) U.S. Cl.
  USPC .......................................... 166/246; 166/371
(58) Field of Classification Search
  None
  See application file for complete search history.

(56) References Cited

U.S. PATENT DOCUMENTS

| | | | |
|---|---|---|---|
| 4,653,584 A * | 3/1987 | Ball et al. ................... | 166/270.1 |
| 5,669,894 A | 9/1997 | Goldman et al. | |
| 5,837,789 A | 11/1998 | Stockhausen et al. | |
| 6,967,261 B1 | 11/2005 | Soerens et al. | |
| 7,462,753 B2 | 12/2008 | Ma et al. | |
| 7,528,291 B2 | 5/2009 | Herfert et al. | |
| 7,541,395 B2 | 6/2009 | Reimann et al. | |
| 2004/0077744 A1 | 4/2004 | Naylor et al. | |
| 2008/0063560 A1 | 3/2008 | Code | |
| 2008/0063694 A1 | 3/2008 | Code | |
| 2008/0095812 A1 | 4/2008 | Code | |
| 2008/0121592 A1 | 5/2008 | Code | |
| 2008/0145391 A1 | 6/2008 | Nelson et al. | |
| 2008/0193562 A1 | 8/2008 | Code | |
| 2009/0028915 A1 | 1/2009 | Code | |
| 2011/0000854 A1* | 1/2011 | Nichols et al. ................ | 210/666 |

FOREIGN PATENT DOCUMENTS

WO          WO02058748           8/2002

OTHER PUBLICATIONS

Gottardi, W. "Iodine and Iodine Compounds," in Block, SS., Disinfection, Sterilization, and Preservation, 4th edition. (Lea & Febiger, 1991), Chapter 8, pp. 152-165, and 166.
Waste Management Factsheet, "Hog Slurry Separation with a Centrifuge," Ministry of Agriculture, Food and Fisheries, Order No. 382.340-1, Mar. 1994. pp. 1-2.
Finney, L., et al., "X-ray Fluorescence Microscopy Reveals Large-scale Relocalization and Extracellular Translocatoin of Cellular Copper During Angiogenesis," in Proceedings from the National Academy of Sciences (PNAS), (The National Academy of Sciences of the USA 2007) Feb. 13, 2007, vol. 104, No. 7 pp. 2247-2252. [Available online www.pnas.org/cgi/doi/10.1073/pnas.0607238104].
Chelme-Ayala, P., "Advanced Treatment of Liquid Swine Manure Using Physico-chemical treatment," in Journal of Hazardous Materials 186 , (Elsevier B.V. 2011) pp. 1632-1638.

* cited by examiner

*Primary Examiner* — Zakiya W Bates
(74) *Attorney, Agent, or Firm* — Mark A. Litman & Associates, P.A.

(57) ABSTRACT

An environment is moderated against microbial buildup, and especially bacterial buildup in an area where residual liquid wastes are collected or retained or added into natural ground formations. Water wastes are created, collected in storage areas or retained in natural land formations after the use of fluids to extract hydrocarbons contained in oil sand or oil shale or other hydrocarbon rich formations. The residual water wastes are of the type that generate or provide or promote in or above the fluid at least one waste selected from the group consisting of bacteria, carbon dioxide, hydrogen sulfide, ammonia, mercaptans and organic acids. A combination is provided of at least one of i) a friction reducing polymer for oil extraction and/or a polymer capable of absorbing at least ten times its weight in water (preferably a super-absorbing polymer) and ii) a combination of salts that react to liberate $I_2$. At least one liquid waste may flocculated with liberated $I_2$ (and any cations from the reactive salts) to form a flocculent that has reduced odor and reduced microbial content. By injecting the iodine-generating composition into the hydrocarbon-rich or hydrocarbon providing composition (e.g., the oil sand or shale in its natural underground formation), some of the iodine or iodine producing materials will be present in both the residual water pumped from the source and water retained in the underground formation to reduce microbial growth.

31 Claims, 5 Drawing Sheets

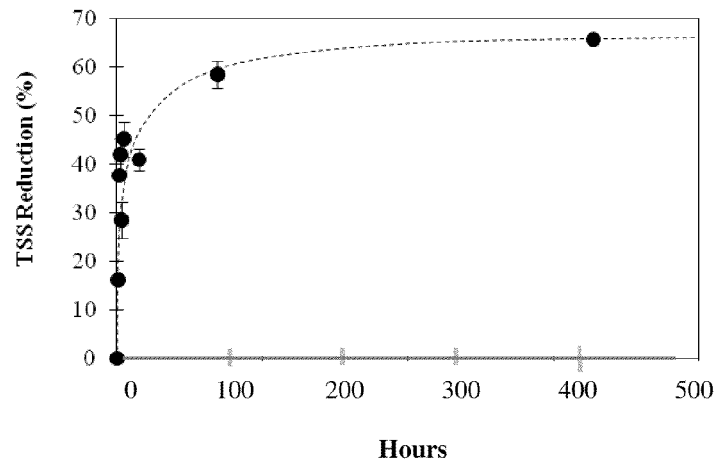
Figure 1. Natural settling of liquid swine manure.
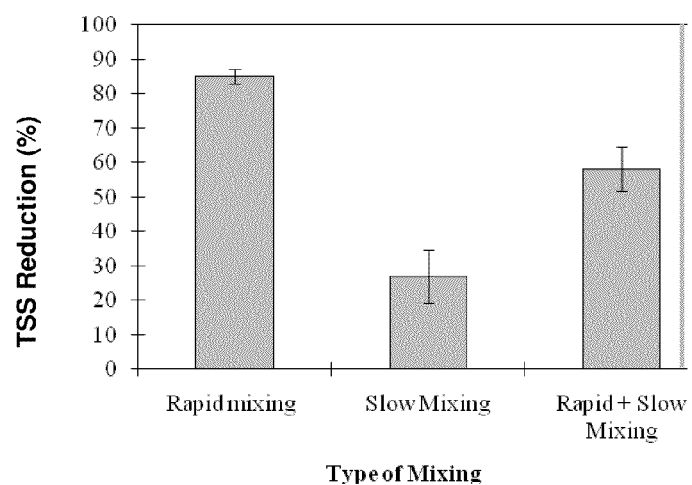
Figure 2. Effect of mixing speed on TSS removal. Experimental condition: dilution = 1:5, $TSS_0 = 470$ mg/L, $pH_0 = 7.78$, $SAP_0 = 0.5$ mg/L.

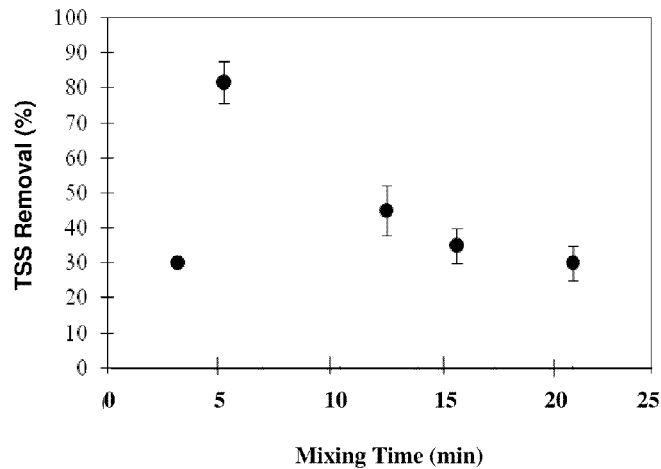
Figure 3. Effect of mixing time on TSS removal. Experimental condition: dilution = 1:5, $TSS_0$ = 200 mg/L, $pH_0$ = 11.07, Speed = 200 rpm, $SAP_0$ = 0.5 g/L.
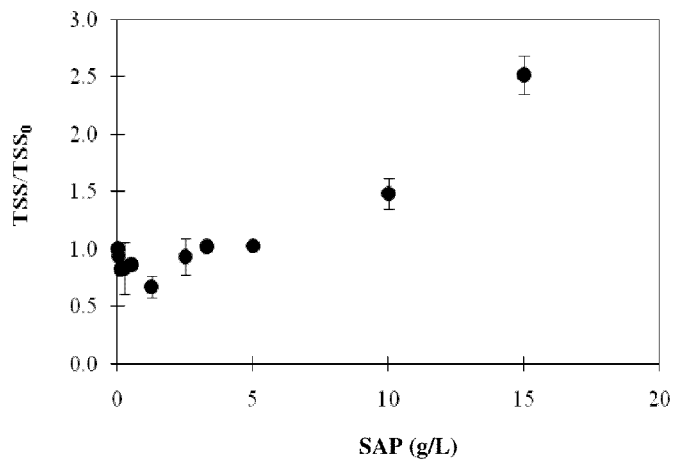
Figure 4. TSS removal using supernatant without dilution. Experimental conditions: $TSS_0$ = 2300 mg/L, $pH_0$ = 7.36, speed: 200 rpm, mixing time = 5 min.

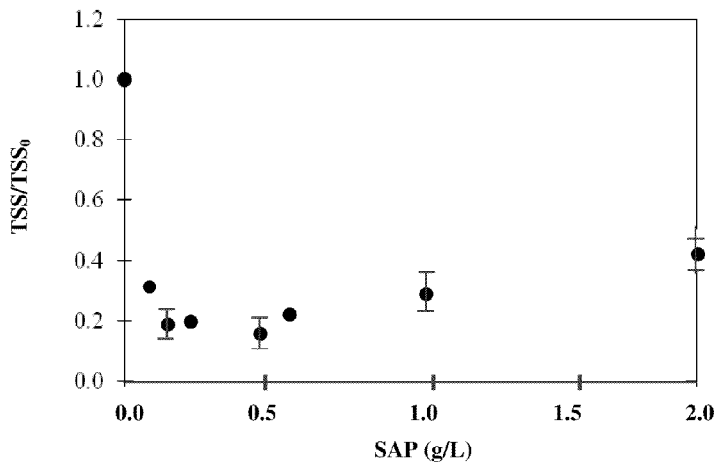
Figure 5. TSS removal using supernatant diluted five times. Experimental conditions: $TSS_0$ = 313 mg/L, $pH_0$ = 11.01, speed: 200 rpm, mixing time = 5 min.
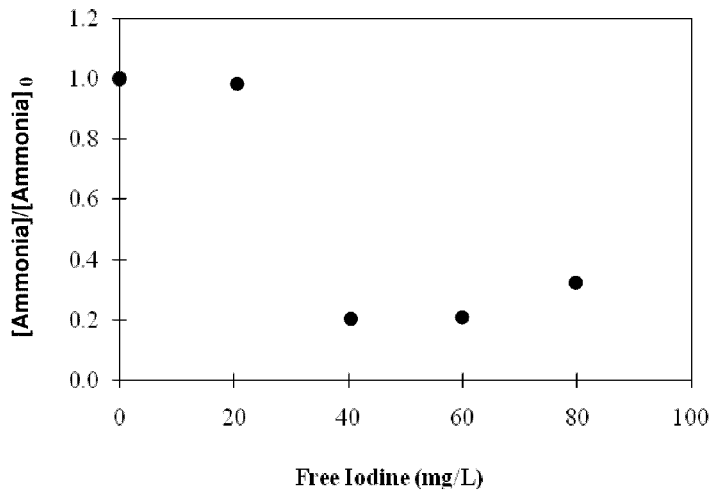
Figure 6. Removal of ammonia using CupriDyne™ tables. Experimental conditions: dilution = 1:1, $ammonia_0$ = 1436 mg/L N, $pH_0$ = 7.69, $SAP_0$ = 1.25 g/L

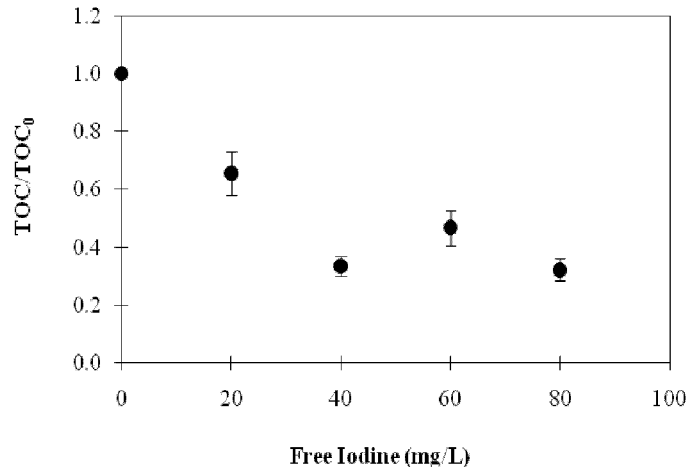
Figure 7. TOC Removal using CupriDyne™ tables. Experimental conditions: dilution = 1:1, $TOC_0$ = 1732 mg/L C, $pH_0$ = 7.69, $SAP_0$ =1.25 g/L.
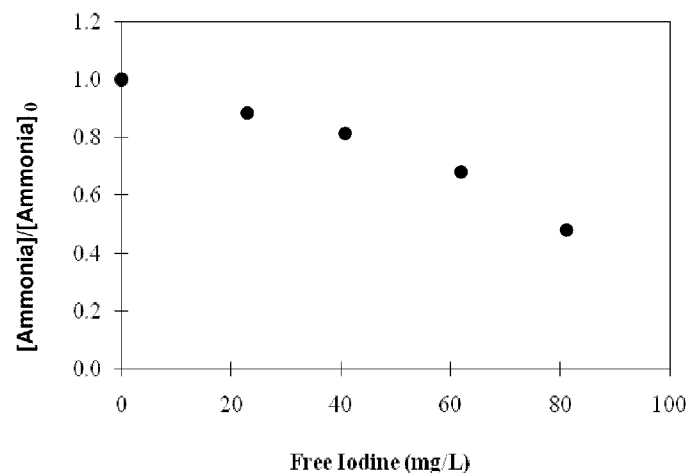
Figure 8. Reduction of ammonia using CupriDyne™ tables. Experimental conditions: dilution=1:5, $pH_0$ = 11.01, $ammonia_0$ = 325 mg/L N, $SAP_0$ =0.5 g/L.

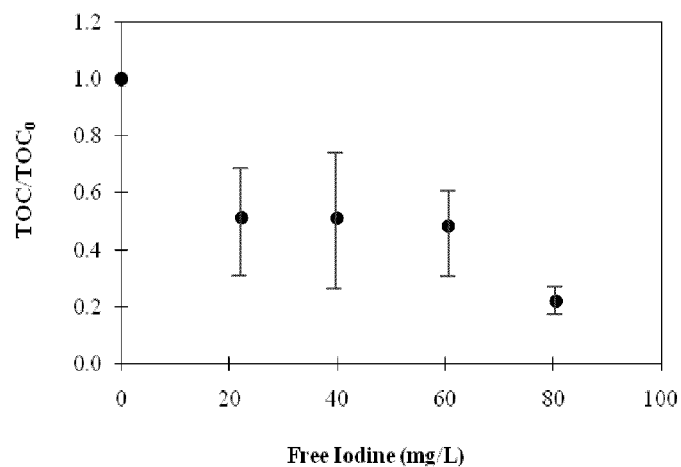
Figure 9. TOC Removal using CupriDyne™ tables. Experimental conditions: dilution=1:5, $TOC_0$ = 509 mg//L C, $pH_0$ = 11.01, $SAP_0$ =1.25 g/L.
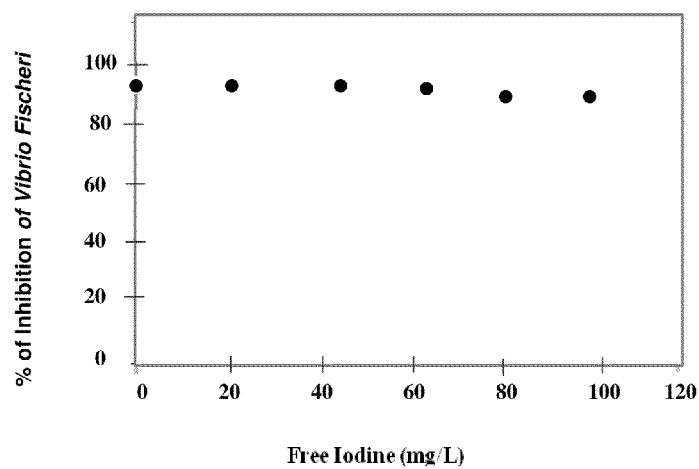
Figure 10. Toxic effects of treated supernatant on *Vibrio fischeri*. Experimental conditions: dilution=1:1, $pH_0$ = 7.58, test: 8% screening test, Phase 2.

MODERATION OF OIL EXTRACTION WASTE ENVIRONMENTS

RELATED APPLICATIONS DATA

This application claims priority from Provisional U.S. Patent Application Ser. No. 61/396,836, filed Jun. 2, 2010 and U.S. Provisional Patent Application Ser. No. 61/378,227 filed Aug. 30, 2010, both claiming priority as a Continuation-in Part application from U.S. patent application Ser. No. 12/220,484, filed Jul. 28, 2008, which in turn claims priority from U.S. Provisional Application Ser. No. 60/961,903, filed Jul. 25, 2007, which in turn claims priority as a Continuation-in-Part application of U.S. Provisional Patent Application Ser. No. 60/850,976, filed Oct. 11, 2006 (now U.S. patent application Ser. No. 11/973,933) which is in turn a Continuation-in-Part of both of U.S. patent application Ser. No. 11/516,960, filed Sep. 7, 2006 and U.S. patent application Ser. No. 11/516,958, filed Sep. 7, 2006. All of these applications are incorporated by reference in their entirety.

BACKGROUND OF THE INVENTION

1. Field of the Invention

The present invention relates to the field of moderation of environments where animal are stored or housed and release waste into an area adjacent, under or into the environment. The invention relates to moderating effects of microbes and gaseous emissions from the waste and to the ability to use bound waste safely and effectively in agricultural applications.

2. Background of the Art

The exploitation of bituminous sands dates back to paleolithic times. The earliest known use of bitumen was by Neanderthals, some 40,000 years ago. Bitumen has been found adhering to stone tools used by Neanderthals at sites in Syria. After the arrival of *Homo sapiens*, humans used bitumen for construction of buildings and water proofing of reed boats, among other uses.

In ancient times, bitumen was primarily a Mesopotamian commodity used by the Sumerians and Babylonians, although it was also found in the Levant and Persia. Along the Tigris and Euphrates rivers, the area was littered with hundreds of pure bitumen seepages. The Mesopotamians used the bitumen for waterproofing boats and buildings. In North America, the early European fur traders found Canadian First Nations using bitumen from the vast Athabasca oil sands to waterproof their birch bark canoes. In Europe, they were extensively mined near the European city of Pechelbronn, where the vapor separation process was in use in 1742.

The name "tar sands" was applied to bituminous sands in the late 19th and early 20th century. People who saw the bituminous sands during this period were familiar with the large amounts of tar residue produced in urban areas as a by-product of the manufacture of coal gas for urban heating and lighting. Naturally occurring bitumen is chemically more similar to asphalt than to tar, and the term "oil sands" (or oilsands) is more commonly used in the producing areas than tar sands because synthetic oil is what is manufactured from the bitumen.

Tar sands are now considered a serious alternative to conventional crude oil, since crude oil is becoming scarce. Oil sands and oil shale have the potential to generate oil for centuries. Oil sands may represent as much as two-thirds of the world's total petroleum resource, with at least 1.7 trillion barrels ($270\times10^9$ m$^3$) in the Canadian Athabasca Oil Sands. In October 2009, the USGS updated the Orinoco tar sands (Venezuela) mean estimated recoverable value to 513 billion barrels ($8.16\times10^{10}$ m$^3$), making it one of the world's largest recoverable oil deposits.

Bituminous sands are a major source of unconventional oil. Conventional crude oil is normally extracted from the ground by drilling oil wells into a petroleum reservoir, allowing oil to flow into them under natural reservoir pressures, although artificial lift and techniques such as water flooding and gas injection are usually required to maintain production as reservoir pressure drops toward the end of a field's life. Because extra-heavy oil and bitumen flow very slowly, if at all, toward producing wells under normal reservoir conditions, the sands must be extracted by strip mining or the oil made to flow into wells by in situ techniques which reduce the viscosity by injecting steam, solvents, and/or hot air into the sands. These processes can use more water and require larger amounts of energy than conventional oil extraction, although many conventional oil fields also require large amounts of water and energy to achieve good rates of production. This is because heavy crude feedstock needs pre-processing before it is fit for conventional refineries. This pre-processing is called 'upgrading', the key components of which are as follows:

1. removal of water, sand, physical waste and lighter products
2. catalytic purification by hydrodemetallisation (HDM), hydrodesulfurization (HDS) and hydrodenitrogenation (HDN)
3. hydrogenation through carbon rejection or catalytic hydrocracking (HCR)

As carbon rejection is very inefficient and wasteful in most cases, catalytic hydrocracking is preferred in most cases. All these processes take large amounts of energy and water, while emitting more carbon dioxide than conventional oil.

Catalytic purification and hydrocracking are together known as hydroprocessing. The big challenge in hydroprocessing is to deal with the impurities found in heavy crude, as they poison the catalysts over time. Many efforts have been made to deal with this to ensure high activity and long life of a catalyst. Catalyst materials and pore size distributions are key parameters that need to be optimized to deal with these challenges and this varies from place to place depending on the kind of feedstock present.

The heavy crude oil or crude bitumen extracted from oil sands is a viscous, solid or semisolid form that does not easily flow at normal oil pipeline temperatures, making it difficult to transport to market and expensive to process into gasoline, diesel fuel, and other products. Despite the difficulty and cost, oil sands are now being mined by energy companies on a vast scale to extract the bitumen, which is then converted into synthetic oil (syncrude) by bitumen upgraders, or refined directly into petroleum products by specialized refineries.

Surface Mining

Since Great Canadian Oil Sands (now Suncor) started operation of its mine in 1967, bitumen has been extracted on a commercial scale from the Athabasca Oil Sands by surface mining. In the Athabasca sands there are very large amounts of bitumen covered by little overburden, making surface mining the most efficient method of extracting it. The overburden consists of water-laden muskeg (peat bog) over top of clay and barren sand. The oil sands themselves are typically 40 to 60 m deep, sitting on top of flat limestone rock. Originally, the sands were mined with draglines and bucket-wheel excavators and moved to the processing plants by conveyor belts. In recent years companies have switched to much cheaper shovel-and-truck operations using the biggest power shovels (100 or more tons) and dump trucks (400 tons) in the world.

This has held production costs to around $27 per barrel of synthetic crude oil despite rising energy and labor costs.

After excavation, hot water and caustic soda (NaOH) are added to the sand, and the resulting slurry is piped to the extraction plant where it is agitated and the oil skimmed from the top. Provided that the water chemistry is appropriate to allow bitumen to separate from sand and clay, the combination of hot water and agitation releases bitumen from the oil sand, and allows small air bubbles to attach to the bitumen droplets. The bitumen froth floats to the top of separation vessels, and is further treated to remove residual water and fine solids. Bitumen is much thicker than traditional crude oil, so it must be either mixed with lighter petroleum (either liquid or gas) or chemically split before it can be transported by pipeline for upgrading into synthetic crude oil. The bitumen is then transported and eventually upgraded into synthetic crude oil. About two tons of oil sands are required to produce one barrel (roughly ⅛ of a ton) of oil. Originally, roughly 75% of the bitumen was recovered from the sand. However, recent enhancements to this method include Tailings Oil Recovery (TOR) units which recover oil from the tailings, Diluent Recovery Units to recover naptha from the froth, Inclined Plate Settlers (IPS) and disc centrifuges. These allow the extraction plants to recover well over 90% of the bitumen in the sand. After oil extraction, the spent sand and other materials are then returned to the mine, which is eventually reclaimed.

Alternative process technology extracts bitumen from oil sands through a dry-retorting. During this process, oil sand is moved through a rotating drum, cracking the bitumen with heat and producing lighter hydrocarbons. Although tested, this technology is not in commercial use yet.

It is estimated that approximately 90% of the Alberta oil sands and nearly all of Venezuelan sands are too far below the surface to use open-pit mining. Several in-situ techniques have been developed to extract this oil.

Cold heavy oil production with sand—In this technique, also known as cold heavy oil production with sand (CHOPS), the oil is simply pumped out of the sands, often using progressive cavity pumps. This only works well in areas where the oil is fluid enough. It has the advantage of being cheap and the disadvantage that it recovers only 5-6% of the oil in place. By removing the sand filters from the wells and the process produced as much sand as possible with the oil, production rates improved remarkably. Further research disclosed that pumping out sand opened "wormholes" in the sand formation which allowed more oil to reach the wellbore. The advantage of this method is better production rates and recovery (around 10%) and the disadvantage that disposing of the produced sand is a problem. A novel way to do this was spreading it on rural roads, which rural governments liked because the oily sand reduced dust and the oil companies did their road maintenance for them. However, governments have become concerned about the large volume and composition of oil spread on roads, so in recent years disposing of oily sand in underground salt caverns has become more common.

Cyclic Steam Stimulation (CSS) or Steam injection (oil industry)—The use of steam injection to recover heavy oil has been in use in the oil fields of California since the 1950s. The Cyclic Steam Stimulation or "huff-and-puff" method has been in use by Imperial Oil at Cold Lake since 1985. In this method, the well is put through cycles of steam injection, soak, and oil production. First, steam is injected into a well at a temperature of 300 to 340 degrees Celsius for a period of weeks to months; then, the well is allowed to sit for days to weeks to allow heat to soak into the formation; and, later, the hot oil is pumped out of the well for a period of weeks or months. Once the production rate falls off, the well is put through another cycle of injection, soak and production. This process is repeated until the cost of injecting steam becomes higher than the money made from producing oil. The CSS method has the advantage that recovery factors are around 20 to 25% and a disadvantage that the cost to inject steam is high.

Steam assisted gravity drainage—Steam assisted gravity drainage was developed in the 1980s and fortuitously coincided with improvements in directional drilling technology that made it quick and inexpensive to do by the mid 1990s. In SAGD, two horizontal wells are drilled in the oil sands, one at the bottom of the formation and another about 5 m above it. These wells are typically drilled in groups off central pads and can extend for miles in all directions. In each well pair, steam is injected into the upper well and the heat melts the bitumen, which allows it to flow into the lower well, where it is pumped to the surface. SAGD is cheaper than CSS, allows very high oil production rates, and recovers up to 60% of the oil in place. Because of its very favorable economics and applicability to a vast area of oil sands, this method alone quadrupled North American oil reserves and allowed Canada to move to second place in world oil reserves after Saudi Arabia.

Vapor Extraction Process (VAPEX)—This process is similar to SAGD but instead of steam, hydrocarbon solvents are injected into the upper well to dilute the bitumen and allow it to flow into the lower well. It has the advantage of much better energy efficiency than steam injection and it does some partial upgrading of bitumen to oil right in the formation.

The above three methods are not mutually exclusive. It is becoming common for wells to be put through one CSS injection-soak-production cycle to condition the formation prior to going to SAGD production, and companies are experimenting with combining VAPEX with SAGD to improve recovery rates and lower energy costs.

Toe to Heel Air Injection (THAI)—This is a very new and experimental method that combines a vertical air injection well with a horizontal production well. The process ignites oil in the reservoir and creates a vertical wall of fire moving from the "toe" of the horizontal well toward the "heel", which burns the heavier oil components and upgrades some of the heavy bitumen into lighter oil right in the formation. Historically fireflood projects have not worked out well because of difficulty in controlling the flame front and a propensity to set the producing wells on fire. However, some oil companies feel the THAI method will be more controllable and practical, and have the advantage of not requiring energy to create steam. Advocates of this method of extraction state that it uses less freshwater, produces 50% less greenhouse gas and has a smaller footprint than other production techniques.

Combustion Overhead Gravity Drainage (COGD)—This is an experimental method that employs an number of vertical air injection wells above a horizontal production well located at the base of the bitumen pay zone. An initial Steam Cycle similar to CSS is used to prepare the bitumen for ignition and mobility. Following that cycle, air is injected into the vertical wells, igniting the upper bitumen and mobilizing (through heating) the lower bitumen to flow into the production well. It is expected that COGD will result in water savings of 80% compared to SAGD.

Like all mining and non-renewable resource development projects, oil sands operations have an adverse effect on the environment. Oil sands projects affect: the land when the bitumen is initially mined and with large deposits of toxic chemicals; the water during the separation process and through the drainage of rivers; and the air due to the release of carbon dioxide and other emissions, as well as deforestation.

Additional indirect environmental effects are that the petroleum products produced are mostly burned, releasing carbon dioxide into the atmosphere.

One of the greatest environment concerns in oil sand is with water contamination and in the actual production of contaminated water rather than merely adding contaminants that could be controlled to existing water supplies. Between 2 to 4.5 volume units of water are used to produce each volume unit of synthetic crude oil (SCO) in an ex-situ mining operation. Despite recycling, almost all of it ends up in tailings ponds, which, as of 2007, covered an area of approximately 50 $km^2$ (19 sq mi). In SAGD operations, 90 to 95 percent of the water is recycled and only about 0.2 volume units of water is used per volume unit of bitumen produced. Large amounts of water are used for oil sands operations—Greenpeace gives the number as 349 million cubic meters per year, twice the amount of water used by the city of Calgary. It is unclear if this is the amount of water they are licensed to remove from the Athabasca or the actual use and how up to date the statistic is. The Athabasca River is also much larger than Bow and Elbow rivers that flow through Calgary.

In October 2009, Suncor Energy announced it was seeking government approval for a new process to recover tailings called Tailings Reduction Operations (TRO), which accelerates the settling of fine clay, sand, water, and residual bitumen in ponds after oil sands extraction. The technology involves dredging mature tailings from a pond bottom, mixing the suspension with a polymer flocculent, and spreading the sludge-like mixture over a "beach" with a shallow grade. According to the company, the process could reduce the time for water reclamation from tailings to weeks rather than years, with the recovered water being recycled into the oil sands plant. In addition to reducing the number of tailing ponds, Suncor claims TRO could reduce the time to reclaim a tailing pond from 40 years at present to 7-10 years, with land rehabilitation continuously following 7 to 10 years behind the mining operations.

Even with the improvements in extraction and storage techniques, the water issues involved with oil sand and residual water from the related processing are further complicated by the fact that these water residues become sources for bacterial contamination and build-up. The open water storage and the mineral and organic content in the residual waters promote bacteria growth and become more hazardous over time. Because of the increasing economic importance of oil sand extraction of hydrocarbons, any technology to further ameliorate residual water issues and particularly the bacterial build-up in the residual waters is important.

The following Published U.S. patent application Documents disclose related technology for treatment of various situations and conditions that have been developed by the present inventor and are incorporated herein by reference in their entirety, Published U.S. Patent Documents 20090028915; 20090193562; 20090145391; 2008121592; 20080095812; 20080063694; and 20080063560. Some of these references disclose the combination of cupric sulfate and potassium iodide combined with superabsorbent polymers, and includes disclosure of adding those materials directly onto flooring and bedding in stalls for animals. This bedding, usually in single animal stalls, must be turned and removed as is bedding, but delays the time period between bedding replacement.

U.S. Pat. No. 7,528,291 (Herfert et al.) describes a color-stable superabsorbent polymer having long-term color stability, and methods of manufacturing the polymer, are disclosed. The color-stable superabsorbent polymer is prepared in the essential absence of a persulfate, and is subjected to a low dose of ultraviolet radiation. The resulting superabsorbent polymer resists color degradation during periods of extended storage, even at an elevated temperature and humidity.

U.S. Pat. No. 5,837,789 (Stockhousen) describes superabsorbing polymers for watery liquids, processes used in their production and their application. The polymers, based on monomers containing carboxylate groups and obtained by a special combination of cross-linking agents and other comonomers, show a combination of properties never attained before with regard to absorption rate, high retention at high absorption under pressure, low soluble content and good permeability of the gel layer for watery liquids under pressure load and stable surface cross-linkage.

U.S. Pat. No. 5,669,894 (Goldman et al.) describes absorbent polymers and materials useful in the containment of fluids, that have at least one region containing hydrogel-forming absorbent polymer in a concentration of from about 60 to 100% by weight and providing a gel-continuous fluid transportation zone when in a swollen state. This hydrogel-forming absorbent polymer has: (a) a Saline Flow Conductivity (SFC) value of at least about $30 \times 10^{-7}$ cm·sup·3 sec/g; (b) a Performance under Pressure (PUP) capacity value of at least about 23 g/g under a confining pressure of 0.7 psi (5 kPa); and (c) a basis weight of at least about 10 gsm. In addition, the region where this hydrogel-forming absorbent polymer is present has, even when subjected to normal use conditions, sufficient wet integrity such that the gel-continuous zone substantially maintains its ability to acquire and transport fluids through the gel-continuous zone.

Published U.S. Patent Publication 20040077744 (Naylor) describes a process of preparing water soluble or water swellable polymer comprising the steps: a) forming an aqueous mixture comprising, i) a water soluble ethylenically unsaturated monomer or blend of monomers and, ii) at least one first ultra-violet initiator, iii) at least one second ultra-violet initiator; b) effecting polymerisation by subjecting the aqueous mixture formed in step (a) to irradiation by ultraviolet light at an intensity of up to 1,000 micrometers $Wcm^{-2}$; subjecting the product of step (b) to irradiation by ultraviolet light of greater than 1,000 micrometers $Wcm^{-2}$, characterised in that a significant amount of the first initiator(s) is/are activated in step (b) and a significant amount of the second initiator(s) is/are activated in step (c). The process is particularly suitable for making highly effective water soluble and water swellable polymers useful as flocculants, coagulants, rheology modifiers, dispersants, superabsorbents and binders etc.

U.S. Pat. No. 7,541,395 (Reimann) describes a process for producing an absorbent polymer including a first mixing event, in which a plurality of absorbent polymer particles (1) are mixed with a liquid (2) and a second mixing event, in which the liquid (2) is homogenized within the interior of the polymer particles. The polymer particles (1) in the first mixing event are mixed with a speed such that the kinetic energy of the individual polymer particles (1) is on average larger than the adhesion energy of the individual polymer particles (1), and the polymer particles (1) in the second mixing event are stirred at a lower speed than in the first mixing event. The different speeds effect a fluidization of the polymer particles (1), which prevents a clumping of the polymer particles (1) during the mixing event. The absorbent polymers thus produced are distinguished by a particularly rapid swelling behavior.

SUMMARY OF THE INVENTION

An environment is moderated against microbial buildup, and especially bacterial buildup in an area where residual liquid wastes are collected or retained in natural ground formations. Water wastes are created, collected in storage areas or retained in natural land formations after the use of fluids to extract hydrocarbons contained in oil sand or shale or other hydrocarbon rich formations. The residual water wastes are of the type that generate or provide or promote in or above the fluid at least one waste selected from the group consisting of bacteria, carbon dioxide, hydrogen sulfide, ammonia, mercaptans and organic acids. A combination is provided of at least one of i) a friction reducing polymer for oil extraction and/or a polymer capable of absorbing at least ten times its weight in water (preferably a super-absorbing polymer) and ii) a combination of salts that react to liberate $I_2$. At least one liquid waste may flocculated with liberated $I_2$ (and any cations from the reactive salts) to form a flocculent that has reduced odor and reduced microbial content. By injecting the iodine-generating composition into the hydrocarbon-rich or hydrocarbon providing composition (e.g., the oil sand or shale in its natural underground formation), some of the iodine or iodine producing materials will be present in both the residual water pumped from the source and water retained in the underground formation to reduce microbial growth.

In one preferred embodiment, iodine is bound e.g., absorbed, adsorbed, entrapped or ionically bound) and more preferably the iodine is ionically bound to moieties in a polymer and especially in a superabsorbent polymer to increase the ionic holding strength of the superabsorbent polymer. One method of binding the iodine to the polymer is to react two salts that liberate molecular iodine in the presence of the polymer, especially the superabsorbent polymer, and preferably in a solution/suspension/dispersion carrying the superabsorbent polymer. It is this enhanced superabsorbent polymer with its greatly increased (more than 2× and as much or more than 6×) ionic holding strength that provides the most significant overall benefits in the practice of the present technology.

Another embodiment for providing, enhancing, summers having iodine associated with the polymer is also by supplementing, or reinvigorating or strengthening iodine within the polymer includes direct electrolysis (oxidation) of an iodide, instead of, or in addition to (downstream). The direct oxidation of the iodide from the energy stored by copper sulfate is understood in the well known in the Schmeisser reaction. The yield of free iodine against a backdrop of circulating iodides will continue to be 1:2 (Lugol theory). Voltages used in the direct electrolysis may be less than and upwards of 20 kV and low amps, in practice.

The polymer or superabsorbent polymer may be ionic, or non-ionic and when iodine is formed in its presence (e.g., from a mix of polymer powder and reactive salts), the superabsorbent polymer develops ionically attached or bound iodine on the polymer backbone. A preferred polymer of all classes will be hydrophilic.

BRIEF DESCRIPTION OF THE FIGURES

FIG. 1 is a Graph showing Natural settling of liquid swine manure.

FIG. 2 Graph. Effect of mixing speed on TSS removal. Experimental condition: dilution=1:5, $TSS_0$=470 mg/L, $pH_0$=7.78, $SAP_0$=0.5 mg/L.

FIG. 3 Graph. Effect of mixing time on TSS removal. Experimental condition: dilution=1:5, $TSS_0$=200 mg/L, $pH_0$=11.07, Speed=200 rpm, $SAP_0$=0.5 g/L FIG. 4 Graph of TSS removal using supernatant without dilution. Experimental conditions: $TSS_0$=2300 mg/L, $pH_0$=7.36, speed: 200 rpm, mixing time=5 min.

FIG. 5 Graph of TSS removal using supernatant diluted five times. Experimental conditions: $TSS_0$=313 mg/L, $pH_0$=11.01, speed: 200 rpm, mixing time=5 min.

FIG. 6 Graph. Removal of ammonia using CupriDyne™ tables. Experimental conditions: dilution=1:1, $ammonia_0$=1436 mg/L N, $pH_0$=7.69, $SAP_0$=1.25 g/L FIG. 7 Graph. TOC Removal using CupriDyne™ tables. Experimental conditions: dilution=1:1, $TOC_0$=1732 mg/L C, $pH_0$=7.69, $SAP_0$=1.25 g/L.

FIG. 8 Graph. Reduction of ammonia using CupriDyne™ tables. Experimental conditions: dilution=1:5, $pH_0$=11.01, $ammonia_0$=325 mg/L N, $SAP_0$=0.5 g/L.

FIG. 9 Graph. TOC Removal using CupriDyne™ tables. Experimental conditions: dilution=1:5, $TOC_0$=509 mg/L C, $pH_0$=11.01, $SAP_0$=1.25 g/L.

FIG. 10 Graph. Toxic effects of treated supernatant on *Vibrio fischeri*. Experimental conditions: dilution=1:1, $pH_0$=7.58, test: 8% screening test, Phase 2.

DETAILED DESCRIPTION OF THE INVENTION

In oilfield applications involving stimulation of the natural occurring compositions such as oil sands, rock and the like through extraction and/or fracturing, there is a need for bacterial removal from the fracturing, extraction or residual fluid. In the case of shale gas production, the oil extraction practice is to use up to 5 million gallons of aqueous fluid which is over 99% water. To facilitate penetration friction reducers are added, in addition to a biocide. The latter has to be tailored to suit the chemistry of the friction reducer. The addition of biocides is in itself an adverse practice because of their expense and the ability of organic biocides to promote resistance to that and other biocides.

Recently, environmental pressures are forcing the recycling of the flow back water (fracture fluid returns). The nature of the rock is such that the flow back water is much more saline than that which goes in. While desalinization is an option, industry is responding with tailoring the fracture fluid to be tolerant to salinity. This has an effect on both additives. Some of the polymers used for friction reduction are not effective in high salinity. The polymer optimized for this purpose may be incompatible with the biocides in use.

A further problem is that even with bacteria free fracturing fluid in use, the bacteria already resident pose a problem. They cause the production of $H_2S$ and also products which plug up the pores. Tight rock such as shale or formations that hold gaseous and/or liquid hydrocarbons has a much less margin for error in this regard.

Solution

The present technology includes a method of moderating (e.g., reducing contaminants or acting as an antimicrobial, especially against bacteria) within an environment in a hydrocarbon extraction process. The method may include steps of:

a) adding liquid in sufficient amount to a natural formation of hydrocarbon-containing volume, the liquid comprising a polymer or superabsorbent polymer carrying molecular iodine such as by absorbing, adsorbing, physically carrying or ionically binding $I_2$ or a superabsorbent polymer in combination with materials that react in the presence of water or alcohol to generate $I_2$ that is carried or ionically bound to the polymer;

b) withdrawing hydrocarbon from the natural formation; and c) allowing at least some polymer with ionically bound $I_2$ to remain within the volume to moderate bacterial growth within the volume.

The method may have further steps of withdrawing at least a portion of the water added to the natural formation of hydrocarbon-containing volume along with at least some hydrocarbon, and then still further steps of removing a portion of the at least some hydrocarbon along with water withdrawn to provide a waste liquid residue containing superabsorbent polymer carrying or ionically binding $I_2$. Non-superabsorbent polymers that may be used particularly include hydrophilic polymers such as polyvinylpyrollidone, polyvinyl alcohol, polyvinylacetate, polyacrylates, and polymers modified to contain hydrophilic groups pendant thereon.

An alternative method may be described as a method of moderating an environment in an area where liquid wastes are collected from a hydrocarbon extraction process, the method having at least steps of:

a) adding liquid in sufficient amount to a natural formation of underground hydrocarbon-containing volume;

b) withdrawing at least a portion of the liquid added to the natural formation of hydrocarbon-containing volume along with at least some hydrocarbon;

c) removing a portion of the at least some hydrocarbon oil to leave a waste liquid residue; and d) adding a superabsorbent polymer with ionically bound $I_2$ to the waste liquid residue to moderate bacterial growth within the waste liquid residue.

The alternative method has at least some waste liquid residue with superabsorbent polymer with ionically bound $I_2$ is returned to the volume to moderate bacterial growth within the volume. Some additional liquid may be added to the waste liquid residue to form flow back liquid and the flow back liquid is returned to the volume. A superabsorbent polymer with ionically bound $I_2$ may be added to the additional liquid prior to or while the flow back liquid is returned to the volume.

At least some $I_2$ may be formed in the presence of the superabsorbent polymer by reacting a combination of materials in the presence of water or alcohol to generate $I_2$ that is ionically bound to the superabsorbent polymer.

At least some of the waste liquid residue may contain at least one additional waste selected from the group consisting of hydrogen sulfide, ammonia, bacteria, mercaptans, methane and organic acids, and from the added liquid reduces emissions or growth of at least one of the additional wastes. In addition to the superabsorbent polymer, an acid may be added to the liquid to maintain the liquid at a pH below 7 and above 5.5. The iodine bound into or carried with the polymers can assist in heavy metal and radioactive metal sequestration and removal. This function is in addition to the antimicrobial functions provided according to the present disclosures.

Supplemental stabilization techniques for the composition before, during or after activation within the collection area includes the acidification of the iodine that is generated by the reaction.

3. Stable Iodine Liquid Compositions/Solutions (Ready to Use and Concentrate)

An iodine solution (as generated herein) is acidified by the addition of an acid that (alone) produces a pH of less than 6.7 at 1.0 N in deionized water and preferably less than 6.5 under those parameters. Typical acids may be organic acids, inorganic acids, Lewis acids, HCl, HI, HBr (halogenic acids), $HNO_3$, $HClO_4$, $H_2SO4$, $H_2SO_3$, and especially the family of sulfamic acids.

The iodine environment can be provided in numerous and varied tasks and services and even in combination with other additives such as stable active solutions or film-breaking compositions such as acids (e.g., sulfamic acid, hydrochloric acid, sulfuric acid, enzymes, etc.). At present, the most widely known and accepted acidizing agents include HCl, sulfamic acid, lactic acid, citric acid, and acetic acid, all with varying degrees of reactivity for descaling. The effect of acidizing with iodine gas in solution, however, also attends with additive antimicrobial effects, and when the acidized iodine is combined with sulfamic acid, a powerful and effective method is provided for dissolving and remediating biofilms, and chelating heavy metals which may be solubilized by the process, or otherwise contained in water, especially after physical disruption as described herein. The acid may be present in any amount desired, with an amount that is at least 0.01N in the aqueous environment being desirable.

The solution is preferred where the acid comprises a sulfamic acid compound having the formula:

wherein R is independently selected from the group consisting of hydrogen and electron-withdrawing groups. The acid may comprise a sulfamic acid compound having the formula:

wherein R is independently selected from the group consisting of hydrogen, halogen, cyano, C1-C6 alkyl, C1 to C6 substituted alkyl, perhalo alkyl, halosubstituted alkyl, and electron-withdrawing groups.

The solution may have at least one R is hydrogen in the sulfamic acid compound or only and exactly one R is hydrogen.

Sulfamic acid is also a primitive surfactant, and when added to free iodine in water and stabilized by varying added compounds such as silicates (e.g., sodium metasilicate) and phosphates and sulfonates (e.g., sodium xylene sulfonate or phosphate), yields a disinfecting and biofilm removing detergent compound which is active within the technologies described herein for oilfield or watershed applications as a single formulary product. The term a "sulfamic acid compound" or a member of the family of sulfamic acids or class of sulfamic acids is herein defined as any sulfamic acid central moiety with a single substituent on the amide group of the sulfamic acid moiety or sulfamic acid core structure that still allows the sulfamic acid derivative in the family of sulfamic acids to display a pH of less than 6.8 at 0.5N in deionized water, preferably less than 6.5 under those parameters (e.g., 5.5 to 6.7, 5.5 to 6.2, and 4.0-6.7, and 3.0 to 6.7 and even lower levels of acidity up to 6.5, up to 6.6 or up to 6.7 pH). As non-limiting examples of these known sulfamic acid family compounds are sulfamic acid, iodosulfamic acid, chlorosulfamic acid, bromosulfamic acid, fluorosulfamic acid, alkylsulfamic acid (with C1-C8 carbon groups, whether linear, branched or cyclic, such as cycloheylsulfamic acid, and substituted or not, such as trifluoromethylsulfamic acid, pentachloroethylsulfamic acid, etc.), cyanosulfamic acid, any electron-withdrawing group on the amide position of the sulfamic acid and even lightly electron-donating groups that do not change the sulfamic acid from an acid to a base at 1.0N in deionized water.

The formula for sulfamic acid is $NH_2SO_3H$ and the corresponding formula for a sulfamic acid compound is represented by:

$NR_2SO_3H$, wherein R is independently selected from the groups described above, such as hydrogen, halogen, cyano, C1-C6 alkyl or substituted alkyl, perhalo alkyl, halosubstituted alkyl, electron-withdrawing groups, mild electron-donating groups and the like. It is preferred that at least one R group is hydrogen.

The method may allow the superabsorbent polymer with ionically bound iodine to flocculate and capture at least one additional waste material. The method may have the reactants that form iodine may be, for example, cupric sulfate and potassium iodide.

The methods described herein may use a combination of salts comprises cupric sulfate and potassium iodide, and the polymer in the flocculent may be, for example, a hypertonic polymer comprising the superabsorbent polymer with ionically bound iodine and ions from the combination of salts. The hydrocarbon-containing volume may be oil sands, tar sands, shale or rock formation containing liquid or gaseous hydrocarbon.

CupriDyne™ antimicrobial systems may be used as the biocide. The advantageous step here would be to host the CupriDyne™ antimicrobial technology in the polymer that has been optimized for friction reduction in saline water and/or in the additional presence of superabsorbent polymers, as those materials are known in the art, and with other water-absorbing carriers. The ability to host the antimicrobials in either cationic or anionic polymers is a unique advantage. This method in effect requires the injection of just one tailored material in place of two. This method is further advantaged by the routine use of weak acids for scale removal, because the lower pH improves the efficacy of the entire process.

A further advantage of the technique is that iodine and products of reaction will by and large continue their action even after the fracturing step has been completed, as molecular iodine will remain dissolved in the residual water system. This is because, in the case of shale gas reservoirs, only about a quarter to a third of the fracture fluid returns. The rest remains in the formation. Consequently, one could expect the antimicrobial ingredients of protection in question to continue their action even in the water remaining within the natural formation. This could be important to attack the spores that tend to form following normal biocide action.

The industry and the government predicts that the industry will expand from an average daily production of 1.2 million barrels of oil a day, to over 6 million barrels a day over the next 20 years. Current production methodology produces greater than 5 times the volume of contaminated water as it does oil. The oil sands industry members are mandated to develop a sustainable solution to manage the contaminated water. A reserve pool of approximately $1 billion has already been set aside for the reclamation, including the oil sands tailings ponds clean up effort. On an ongoing basis, the government sets approximately $5.00 per barrel of oil produced by industry, aside for these purposes.

An environment is moderated against microbial buildup, and especially bacterial buildup in an area where residual liquid wastes are collected or retained in natural ground formations. Water wastes are created, collected in storage areas or retained in natural land formations after the use of fluids to extract hydrocarbons contained in oil sand or shale or other hydrocarbon rich formations. The residual water wastes are of the type that generate or provide or promote in or above the fluid at least one waste selected from the group consisting of bacteria, carbon dioxide, hydrogen sulfide, ammonia, mercaptans and organic acids. A combination is provided of at least one of i) a friction reducing polymer for oil extraction and/or a polymer capable of absorbing at least ten times its weight in water (preferably a super-absorbing polymer) and ii) a combination of salts that react to liberate $I_2$. At least one liquid waste may flocculated with liberated $I_2$ (and any cations from the reactive salts) to form a flocculent that has reduced odor and reduced microbial content. By injecting the iodine-generating composition into the hydrocarbon-rich or hydrocarbon providing composition (e.g., the oil sand or shale in its natural underground formation), some of the iodine or iodine producing materials will be present in both the residual water pumped from the source and water retained in the underground formation to reduce microbial growth.

The present disclosure includes novel technology including at least a method of moderating an environment in an area where liquid wastes are collected from an oil extraction process, the method having at least steps of:

a) adding liquid in sufficient amount to a natural formation of hydrocarbon oil-containing volume, the liquid comprising $I_2$ or a combination of materials that react in the presence of water or alcohol to generate $I_2$;

b) withdrawing at least a portion of the water added to the natural formation of hydrocarbon oil-containing volume along with at least some hydrocarbon oil;

c) removing a portion of the at least some hydrocarbon oil to leave a waste liquid residue; and d) retaining at least some of the $I_2$ in the waste liquid residue.

An alternative method of moderating an environment in an area where liquid wastes are collected from an oil extraction process may be described as having at least steps of:

a) adding liquid in sufficient amount to a natural formation of hydrocarbon oil-containing volume;

b) withdrawing at least a portion of the water added to the natural formation of hydrocarbon oil-containing volume along with at least some hydrocarbon oil;

c) removing a portion of the at least some hydrocarbon oil to leave a waste liquid residue; and d) adding a composition comprising $I_2$ or a combination of materials that react in the presence of water or alcohol into the waste liquid residue to generate $I_2$ in the waste liquid residue.

In these methods, at least some $I_2$ or a combination of materials that react in the presence of water or alcohol to generate $I_2$ is left within the natural formation of hydrocarbon-containing volume. At least some of the waste liquid residue comprises at least one additional waste selected from the group consisting of carbon dioxide, hydrogen sulfide, ammonia, methane, mercaptans and organic acids, and from the added liquid reduces emissions of at least one of the additional wastes. The added liquid or composition may further contain a polymer capable of absorbing at least ten times its weight in water. The polymer may be a superabsorbent polymer, and the superabsorbent polymer retains some iodine therein and at least some of the liquid waste residue is flocculated with the superabsorbent polymer. Some flocculating may be done with at least some of the liquid waste residue is done with entrapped $I_2$ within the superabsorbent polymer. The combination of salts may be, for example, cupric sulfate and potassium iodide. The polymer in the flocculent may be a hypertonic polymer comprising a superabsorbent polymer with ions from the combination of salts, and the polymer may have been polymerized from an acrylic acid, methacrylic acid, acrylic acid salt and/or methacrylic acid salt moieties. The methods are particularly useful where the hydrocarbon oil-containing volume contains oil sands, shale or other entrapped hydrocarbon-based oil that can be released by water, heated water, steam, organic fluids and the like, heated or not.

In one preferred embodiment, iodine is ionically bound to moieties in a superabsorbent polymer to increase the ionic holding strength of the superabsorbent polymer. It is this enhanced superabsorbent polymer with its greatly increased (more than 2× and as much or more than 6×) ionic holding strength that provides the most significant overall benefits in the practice of the present technology.

The ionic binding of the iodine ($I_2$) is not done by forming an iodide salt, but by maintaining the molecular iodine ($I_2$) presence by van derWaal's forces, zwitterionic forces or chelating forces of the iodine ($I_2$) to polymer units. This superabsorbent polymer (SAP) with ionically bound iodine (SAP-I) can be used as a lubricant or additive to lubricants or with muds or other drilling active equipment to be pushed down the bore hole. The combination of the iodine-bound polymer is particularly beneficial as it acts as a broad spectrum antimicrobial, acting against even anaerobic microbes within the well hole and then also as an antimicrobial against aerobic microbes when a portion of the (SAP-I) is withdrawn along with the extracted oil and liquid mixture.

The removed or extracted liquid and oil material is treated as is normally extracted oil sands material, which may be by a shale shaker, centrifuge, filtering, washing, settling and separation, or other physical processes. Part of the SAP-I will be able to be returned for reuse in the bore hole after the separation in many instances, while other portions will remain above ground with residual water from the operation.

It is also desirable to have an acid present with the liquid (e.g., sulfamic acid, citric acid, etc.) to improve efficiency of the SAP-I by maintaining a pH in the liquid below 7.0 and above 5.5, preferably between 5.7 and 6.7.

The practice of this oil sands residual water treatment can, in one embodiment, be similar to the methods used and described in copending Provisional U.S. Patent Application Ser. No. 61/396,836, filed Jun. 2, 2010. The compositions and methods used therein may be used in one embodiment of the presently disclosed and claimed invention, with the present technology disclosed herein also allowing a broader range of ingredients. That copending method moderates an agricultural, farm environment in an facility where animal wastes are collected from a large scale animal housing environment into a fluid containing compartment. The fluid containing department may be located directly under the animal housing, or may have ducts that carry liquid waste away to the containment compartment. In the latter case, it is particularly useful to have some additional liquid (besides the animal waste) assist in carrying the primary liquid animal waste (and any solids) towards the containment compartment. The general type of method may involve:

a) collecting primary animal waste (e.g., feces and/or urine) from multiple animals within an animal storage facility into a fluid containing compartment. Typically the primary animal waste generates or provides in or above the fluid containing compartment at least one secondary waste selected from the group consisting of carbon dioxide, hydrogen sulfide, ammonia, mercaptans and organic acids, as well as carrying microorganisms. To address many of the problems that occur in or result from the secondary waste, a combination of i) a polymer capable of absorbing at least ten times its weight in water and ii) iodide, iodine and/or a combination of salts that react to liberate $I_2$ are provided directly into the primary waste. The addition of the combination, provided before primary waste delivery, during primary waste delivery or in a reasonable time frame (within days or weeks, so long term effects do not occur) after primary waste delivery effects flocculation of an at least one secondary waste with free iodine or liberated $I_2$ to form a flocculent.

The flocculent can be applied to agricultural farm land with significant positive benefits. As the iodine is a strong antimicrobial, the flocculent is not carrying dangerous infectious content into the soil. Of equal importance is the fact that by stably binding or sequestering available nitrogen compounds (e.g., ammonia), carbon compounds (carbon dioxide), sulfur compounds, phosphorous compounds and potassium compounds enables the flocculent to become a full value NPK (nitrogen, phosphorous and potassium) fertilizer. Thus, a dangerous waste that was a difficult disposal problem is converted to a valuable commodity. Practice of this technology can therefore strengthen a healthful environment for the animals and workers and reduce ancillary agricultural costs by providing useful fertilizer for farms as opposed to relatively toxic and odorous wastes.

The invention may also provide, as a final product in the environmental moderation of the animal habitat or storage area a flocculent for use as an improved anti-leaching fertilizer and soil hydration amendment. The flocculent may have: i) oil extraction polymeric lubricants and/or a superabsorbent polymer, ii) water of hydration and iii) a residue of salts that have previously reacted to liberate $I_2$. At least some iodide is entrapped in the polymer or flocculent with the polymer. At least some iodide is in the flocculent sequesters a waste material selected from the group consisting of carbon dioxide, hydrogen sulfide, ammonia, nitrates, nitrites, methane, mercaptans and organic acids. The different waste materials may be in various states or degrees of oxidation. The iodine released also acts as an antimicrobial agent against which resistance is at least difficult to occur as the iodine literally oxidizes microbes or portions thereof.

Examples and descriptions used in this disclosure include reference to the treatment of animal waste as the technologies discovered by Applicant are related in some ways, and the evidence of microbial reduction in the animal waste environment is substantive evidence of the effects of antimicrobial activity that occurs in residual aqueous wastes from hydrocarbon reclaiming or extraction as described herein.

The present technology provides a wide range of safe technology to a field in need of environmental improvement, the residual or overflow water from oil sand or shale extraction of hydrocarbons and organics. Similar to the corporate livestock environment, large volumes of treated extractant (just as with large numbers of livestock, avian and mammals) are provided in concentrated areas that generate large volumes of waste. The waste provides a multiplicity of problems with respect to offensive odors, microbial concentrations, disposal problems, costs, efficiency and general health hazards for the environment and workers. Any improvement in the environment of the system would be significant. The present technology provides a significant and major improvement to aspects of the problem.

The technology includes injecting an additive into the oil sands composition in an aqueous carrier or as a solid with water added previously or subsequently with the active composition of the present disclosure. At least one required set of ingredients is the combination of two salts that react in the presence of water to liberate molecular iodine ($I_2$). The materials and chemical reactions for that process are thoroughly detailed in the references of Applicant incorporated by reference above.

Additionally, the composite can contain other additives, such as, for example, antioxidants, ultra-violet light stabilizers, additives to improve the comparative tracking index (an electrical property), processing additives, and other additives used by those skilled in the art. Examples of ultra-violet light stabilizers include, but are not limited to, various substituted resorcinols, salicylates, benzotriazoles, benzophenones, and combinations thereof. Furthermore, the composite can also include lubricants and release agents, colorants (including dyes and pigments), fibrous and particulate fillers, nucleating agents and plasticizers to improve handling and processing properties of the composite and/or reduce its cost. Examples of lubricants and release agents include, but are not limited to, organic acids having at least 8 carbon atoms therein, such as stearic acid, stearic alcohol, behenic acid, and the like, amides and other esters of organic acids having at least 8 carbon atoms in the acid portion thereof such as alkylamides such as stearamides, and combinations thereof. Also any methods known in the art for incorporating any one or any combination of the foregoing additives in a polymer composition can be employed in the present invention.

A preferred polymeric carrier composition also would include at least 5% by weight of the iodine releasing salts of a superabsorbent polymer to assist in binding the iodide and iodine and flocculating the water residue to assist in physical collection and handling of particularly smaller amounts of water residue, as may overflow containment areas.

One aspect of the present technology may also be narrowly described as providing an absorbent, especially superabsorbent polymer with increased ionic sites (especially halide sites, and more particularly chlorine, bromine and iodine sites, most particularly iodine and iodide sites on the superabsorbent polymer, and the addition of this polymer composition to hydrocarbon masses from which the hydrocarbons are to be extracted from the land masses in bulk.

Superabsorbent polymers are generally made of a polymer network and can absorb large amounts of water due to their ionic nature and interconnected structure. This network creates a membrane that allows water diffusion. The polymer absorbs water by osmosis: The large concentration of sodium inside the polymer network makes water flow into the polymer until equilibrium is reached, or the concentration of ions in the polymer equals the concentration of ions outside the polymer. (From a biological point of view, the polymer is hypertonic relative to the outside environment, which is hypotonic. Therefore, water diffuses into the polymer until equilibrium is reached.) Water is caught and held inside the polymer network by hydrogen bonds that it forms with the sodium acrylate monomers, forming a gel. Sodium polyacrylate can absorb about 800 times its weight in distilled water (800 g water: 1 g polymer) and 300 times its weight in tap water. Absorbency decreases as the water's ion concentration increases. In diapers, the polymer's absorbency is only 30 times its weight due to urine's salt concentration (0.9% NaCl [aq]) plus the mechanical pressure from a baby's weight.

By the addition of the additional active ionic sites directly into the superabsorbent polymer (e.g., in initial concentrations of at least about 0.0001% by weight iodine (or other halogen)/SAP solids (excluding water weight), preferably at least 0.0005%, more preferably 0.001% by weight iodine/SAP and most preferably from 0.001% to 0.5% iodine/SAP is extremely beneficial in the practice of the present technology. No "free iodine" would be bound directly by the polymer if iodine solids were added to the SAP, but there could be a reaction used to convert the iodine to iodide or iodophors and reform iodine to enable the antimicrobial activity. This is too complex for only commercial and economic reasons, while the use of Curpidyne™ particle technology is simpler and more effective. In fact, the BASF patents mentioned earlier teach that iodine stocked on polyvinyl pyrrolidone is either iodophor, or metallic iodine (as tri-iodide), so that a pH lowering agent like citric acid must also be present to elute the free iodine. Then, of course, the disinfectant properties are equally pH lowering besides the oxidation by iodine.

The flash antimicrobial effect of free iodine is still unique, because in the process of making an iodide somewhere along the polymer chain, there is an active and effective oxidation step. The SAP's we use are normally cationic, so many of the reaction products are electrically bound to the polymer. The combination of the iodine with the SAP and the Cu with the SAP and the combination of both the iodine and the Cu with the SAP acts to provide a platform (the modified polymer) that creates a hypertonic superabsorbent polymer. The polymer, with the entrained iodine, iodide and copper can act as a chelate or chlathrate while performing its other functions of antimicrobial and anti-odor activities. In addition to these functions, the coagulated or flocculated mass of the liquid animal waste and the hypertonic SAP can be then directly added (with or without any intermediate drying) as a fertilizer onto arable land. It may even be added safely to landfill mass to improve the quality of the fill.

It is to be noted that the iodine less preferably may be added into the SAP even in a dry state, rather than using the Cupridyne™ technology to release it upon demand, mainly because of the high moisture content and the duration of the presence of the iodine/SAP combination in the liquid waste. Therefore, although it is highly preferred to provide the iodine-releasing system as the Cupridyne™ system or pellets, any other method of providing the additional halogen (iodine or iodide) content and subsequent ionic sites into the superabsorbent polymers, especially in combination with the copper and other counter-anions.

A method according to the present technology moderates an environment in an area where liquid wastes are collected in a fluid containing compartment. The fluid containing compartments receive solid, liquid and mixed solid and liquid compositions according to the present technology, either by injection into volumes underground in land masses from which hydrocarbons such as oils, bitumen and the like are being removed from natural deposits and/or injection into liquid wastes from large volume emissions of materials pumped into natural underground reservoirs of oils and the like, or a combination of the two treatments. The method acts by:

a) pumping the water (or liquid) of extraction into the underground formation and deposits from which oil is to be extracted;

b) collecting the liquid extracted waste in a fluid containing compartment, or tank, or pond after removal of at least some of the extracted oil, and/or c) adding at least some iodine releasing composition into the collected liquid.

The collected liquid will often have emissions selected from the group consisting of carbon dioxide, hydrogen sulfide, ammonia, methane, mercaptans and organic acids (the gases may be dissolved in the solids or liquids or may be provided by decomposition of or reaction of the solid and liquid wastes), and the iodine will also reduce the odor and emissions of some of these materials from the collected water, especially in combination with the absorbent, and especially with the superabsorbent polymer.

A preferred method includes providing a combination of i) a polymer capable of absorbing at least ten times its weight in water and ii) a combination of salts that react to liberate $I_2$; and flocculating an at least one portion of liquid waste with liberated $I_2$ to form a flocculant. The preferred salts are disclosed in the Code Applications and patents cited above and include a combination of salts comprising cupric sulfate and potassium iodide. The polymer may provide a hypertonic polymer when combined with ions from the combination of salts. A preferred polymer comprises acrylic acid, methacrylic acid, acrylic acid salt and/or methacrylic acid salt moieties. A most preferred polymer comprises a superabsorbent polymer as known in the art and as described herein. These superabsorbent polymers include materials that absorb at least 10×, at least 20×, at least 40× and at least 100× times their solids weight of water.

The fluid extraction waste compartment is generally positioned below ground or on the ground (e.g., trenches or pools) and waste from the extraction is fed by gravity, pumps or siphoned or periodically flushed from the formation from which the oil is being removed by combination with the injected or pumped in liquids. An aspect of the present technology that has not been considered in the art is the interaction and synergy of the salt system releasing iodine and the superabsorbent polymer. At least the iodine (as molecular iodine and resulting iodide) can attach to moieties in the polymer to create iodine and/or iodide reactive sites and functions on the polymer molecule. The hydrated polymer (superabsorbent polymer) therefore provides sites that can sequester other molecules and/or provide antimicrobial activity. The cupric rich and iodine rich polymer composition can and does cause flocculation of the some of the waste materials, sequesters carbon dioxide (each $I_2$ molecule can sequester approximately 14 carbon dioxide molecules), bind or sequester nitrogen containing compounds (ammonia, amines, etc.), bind or sequester mercaptans and sulfur compounds, and fix those compounds within the flocculation so that there are biologically available and retained in the flocculent which may then even be applied to soil as fertilizer. The totality of these abilities was not known prior to the present inventor's work.

Superabsorbent polymers (SAP) (also called slush powder) are polymers that can absorb and retain extremely large amounts of a liquid relative to their own mass.

Water absorbing polymers, classified as hydrogels, absorb aqueous solutions through hydrogen bonding with the water molecule. So an SAP's ability to absorb water is a factor of the ionic concentration of an aqueous solution. In deionized and distilled water, SAP may absorb 500 times its weight (from 30-60 times its own volume), but when put into a 0.9% saline solution, the absorbency drops to maybe 50 times its weight. The presence of valent cations in the solution will impede the polymers ability to bond with the water molecule.

The total absorbency and swelling capacity are controlled by the type and degree of cross-linking to the polymer. Low density cross-linked SAP generally has a higher absorbent capacity and swell to a larger degree. These types of SAPs also have a softer and more cohesive gel formation. High cross-link density polymers exhibit lower absorbent capacity and swell. The gel strength is firmer and can maintain particle shape even under modest pressure.

In the early 1960s, the United States Department of Agriculture (USDA) was conducting work on materials to improve water conservation in soils. They developed a resin based on the grafting of acrylonitrile polymer onto the backbone of starch molecules (i.e., starch-grafting). The hydrolyzed product of the hydrolysis of this starch-acrylonitrile co-polymer gave water absorption greater than 400 times its weight. Also, the gel did not release liquid water the way that fiber-based absorbents do.

The polymer came to be known as "Super Slurper." The USDA gave the technical know how to several USA companies for further development of the basic technology. A wide range of grating combinations were attempted including work with acrylic acid, acrylamide and polyvinyl alcohol (PVA). Polyacrylate/polyacrylamide copolymers were originally designed for use in conditions with high electrolyte/mineral content and a need for long term stability including numerous wet/dry cycles. Uses include agricultural and horticultural. With the added strength of the acrylamide monomer, used as medical spill control, wire & cable waterblocking.

Copolymer Chemistry

Superabsorbent polymers are now commonly made from the polymerization of acrylic acid blended with sodium hydroxide in the presence of an initiator to form a poly-acrylic acid sodium salt (sometimes referred to as sodium polyacrylate). This polymer is the most common type of SAP made in the world today. Other materials are also used to make a superabsorbent polymer, such as polyacrylamide copolymer, ethylene maleic anhydride copolymer, cross-linked carboxymethyl-cellulose, polyvinyl alcohol copolymers, cross-linked polyethylene oxide, and starch grafted copolymer of polyacrylonitrile to name a few. The latter is one of the oldest SAP forms created.

Today superabsorbent polymers are made using one of two primary methods; suspension polymerization or solution polymerization. Both processes have their advantages over the other and both yield a consistent quality of product.

Solution Polymerization

Solution polymers offer the absorbency of a granular polymer supplied in solution form. Solutions and can be diluted with water prior to application. After drying at a specific temperature for a specific time, the result is a coated substrate with superabsorbent functionality. For example, this chemistry can be applied directly onto wires & cables, though it is especially optimized for use on components such as rolled goods or sheeted substrates.

Solution based polymerization is the most common process used today for SAP manufacture. This process is efficient and generally has a lower capital cost base. The solution process uses a water based monomer solution to produce a mass of reactant polymerized gel. The polymerization's own reaction energy (exothermic) is used to drive much of the process, helping reduce manufacturing cost. The reactant polymer gel is then chopped, dried and ground to its final granule size. Any treatments to enhance performance characteristics of the SAP are usually accomplished after the final granule size is created.

Suspension Polymerization

The suspension process is practiced by only a few companies because it offers a higher degree of production control and product engineering during polymerization step. This process suspends the water based reactant in a hydrocarbon based solvent. The net result is that the suspension polymerization creates the primary polymer particle in the reactor rather than mechanically in post-reactions stages. Performance enhancements can also be during or just after the reaction stage.

Many industrial companies produce some type of superabsorbent polymer. In the U.S., current manufacturers of acrylate-based superabsorbents include The Dow Chemical Company, Sanyo Chemical Industries, Nippon Shokubai Company, and the Chemdal Corporation, which is a subsidiary of AMCOL International. Other manufacturers located in Europe include AMCOL, Stockhausen GMBH, Dow Chemical, Hoechst Casella, Allied Colloids, and Nippon Shokubai. Superabsorbent polymer production in Japan comes from companies such as Nippon Shokubai, Sanyo, Mitsubishi Petrochemical Company, and Sumitomo Seika.

The structure of Polyacrylic acid is as follows, and contains an ionizable group on each repeat unit (—COOH).

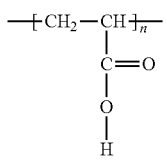

wherein n is an integer.

These polymer chains are then crosslinked at the —OH. The mechanism of swelling of ionized, crosslinked polymer networks is based upon the concept of osmotic pressure. The polymer acts as a semipermeable membrane which does not allow charge substituents to exit the polymer into the surrounding solution. This is because the ionized monomeric units contain fixed charges which attract and fix ions from the outer solution. Therefore, a charge gradient is set up, in which the concentration of free ions is greater outside of the polymer. Therefore, the osmotic pressure exerted by the gradient causes the polymer chain to swell as further ions diffuse in.

The following examples are prophetic examples showing the functionality of the SAP and CupriDyne™ disinfectant composition on animal waste environments.

EXAMPLES 1. (Prophetic) 10 kilogram of superabsorbent polymer (such as that available from Jinhu Sanitary Napkin Equipment Co. Ltd., Taiwan, China, called SAP—Superabsorbent Polymer, model number 283FHA) in fiber form would be combined by dry mixing with 200 grams each of cupric sulfate particles and potassium iodide particles having silica standoff particles surrounding the potassium iodide particles according to the teachings of Published U.S. Patent Documents 20090028915; 20090193562; 20090145391. The approximately stoichiometric provision of cupric sulfate particles and potassium iodide particles is known from these references and in the art as a Cupridyne™ system, from BioLargo, Inc.

The dry blend would be carried to a pig-under commercial pen system having 150 swine billeted in the facility. The dry blend would be evenly distributed on the floor of the holding tank before swine were stabled for long term feeding and growth in the facility. As wastes from the swine pass through the open flooring to the pig-under waste collection compartment, the liquid content in the waste would begin to open up the KI particles and allow generation of iodine. The iodine would be in an active antimicrobial state, even though binding into the superabsorbent polymer. The iodine would sequester ammonia, organic acids and carbon dioxide in or generated in the waste, while also killing microbes in the collecting waste. This action would reduce levels of infectious materials and reduce odors in the penning system.

After about three months, the wastes would have fully exhausted the absorption, flocculation and antimicrobial activity of the iodine, so the flocculent would be carried to the fields for dispersal. The iodine and iodide have bound the ammonia, carbon dioxide and organic acids into the superabsorbent polymer to enable the flocculent to fix the nutrients to the soil. The SAP would then degrade over time as the nutrients were used up by planting in the field.

Liquid swine manure was treated by physical-chemical treatment, including coagulation and flocculation, followed by sedimentation at bench scale level. CupriDyne™ superabsorbent polymer (SAP) and CupriDyne™ tablets were used as coagulant and disinfectant agents, respectively, applied at different phases. The optimum conditions were determined based on the removal of total suspended solids (TSS) for Phase 1, and ammonia and total organic carbon (TOC) reductions for Phase 2. It was found that SAP at concentration of 1.25 g/L was able to reduce 33% of the initial TSS, in experiments using supernatant at natural pH. Following the SAP application, 80% of initial ammonia, 78% of initial TOC, and 93% of the total coliforms were reduced using 40 mg/L of free iodine. Experiments were also performed using diluted supernatant. The results indicated that SAP at concentration of 0.5 g/L was capable of reducing 82% of the initial TSS in experiments using supernatant, diluted 5 times, at pH 11. After the tablet application, 50% of initial ammonia, 77% of initial TOC, and 100% of the total coliforms were reduced using 80 mg/L of free iodine.

From the leaching tests using non-diluted supernatant, it was found that 24% of the chloride and 50% of the phosphate ions retained in the sludge leached to the ultrapure water after 48 hours. For the experiments using diluted supernatant, it was noted that 12% of the chloride and 2% of the nitrite ions retained in the sludge were found in the ultrapure water after 48 hours. The results obtained suggest that the CupriDyne™ system technology is a very effective alternative to existing liquid manure handling methods in terms of nutrient, TSS, and coliform reductions. Special attention should be given to the sludge generated after treatment because of a possible leaching of major ions.

The livestock industries are growing rapidly along with the human population. Because of this increasing trend, tons of swine manures are being generated annually worldwide. Swine manure contains the urine and feces of pigs, as well as water spillage, remains of undigested feed items, and antimicrobial drug residues. Swine manure may contain about 80 to 90% liquid when it is excreted. Typical swine manure is characterized by high content of solids, high biochemical oxygen demand, high phosphorus and nitrogen contents as well as high levels of microbial population. Environmental water quality problems caused by swine manure have arisen because of the excess of manure generation relative to land availability and inadequate manure storage and handling procedures. Improper management of animal waste can cause a negative impact on the environment. Problems such as water contamination and human health concerns due to the presence of microorganism in animal manures have been reported. Other problems associated with swine manure are odors caused by gases produced by decomposing manure in swine manure facilities. Nutrients leaching below the root zone and into groundwater together with nutrients entering into surface water systems through runoff from manure store facilities are other concerns caused by the improper swine manure management.

Waste animal management may comprise collection, storage, treatment and utilization. A common method to handle swine manure is wastewater treatment. Physico-chemical methods have been found to be effective technologies to remove solids and nutrients from animal manure. These methods are used to separate liquid and solid fractions for better management, to reuse the liquids, and to reduce the volume of manure to be transported. The separation of this wastewater may include chemical-aid coagulation, mixing, flocculation, and sedimentation. Chemicals coagulants used in chemical treatment include inorganic chemicals such as alum and ferric salts and organic substances such as polyamines and polyquaternary amines Coagulation-flocculation is a conventional physical-chemical treatment process used to separate the suspended solids portion from the water. The objectives of this research were to investigate whether the coagulation-flocculation process utilizing a new mineral and salt formulation called CupriDyne™ system was an effective and applicable process for the treatment of swine manure and to find the optimum treatment conditions and most effective chemical doses to yield the higher removal efficiencies in terms of total suspended solids and nutrient removal. To assess the safety for disposal of sludge generated from the coagulation/flocculation process, a leaching study was conducted as the last goal of this research.

Research on these issues was performed by the inventor and results were achieved through the performance of the series of phases listed and discussed below.

Phase 1:

The determination of optimum conditions based on maximum total suspended solids removal during coagulation and flocculation was the first step in this research. The experiments were performed using the classic jar test apparatus (Phipps and Bird 6-place paddle stirrer apparatus). In this stage, the CupriDyne™ system plus superabsorbent polymer (SAP) was added to the process as coagulant agent. The CupriDyne™ would be tried at various times in weight ranges of from 0.001% by weight of the two reactive ingredients (stoichiometric, 1:1, molecular ratio of $CuSO_4$ and KI particles), up to 50% by weight of the active ingredients in small laboratory scale tests to see if flocculation could occur. Tablet applications (weight to weight of the dry SAP) of from 0.01% to 10% were found to be commercially viable, with greater amounts of the pellets having good effect, but deemphasizing the flocculation function, while lesser amounts would not have either as immediate large scale effect or as persistent an effect as the intermediate ranges. All ranges of combined Cupridyne™ pellets and SAP between 0.001% to 50% showed measurable benefits according to the present technology and are including within the broad scope of this disclosure. The most important parameters affecting the coagulation/flocculation processes such as coagulation mixing intensity, coagulation mixing time, coagulant dose were determined. During the experiments, the raw and treated liquid swine manure were characterized by various water quality parameters including pH, total suspended solids (TSS), total volatile solids (TVS), total fixed solids (TFS), total dissolved solids (TDS), total phosphorus (TP), total Kjeldahl nitrogen (TKN), nitrite, nitrate, biochemical oxygen demand (BOD), and chemical oxygen demand (COD).

The CupriDyne™ system technology generates free iodine by dissolving two proprietary chemical compounds in water (stoichiometric, 1:1, molecular ratio of $CuSO_4$ and KI particles). Free iodine is an effective disinfectant and is soluble in water up to 337 mg/L. Therefore, to test the disinfection efficiency, fecal and total coliform were determined before and after treatment. The toxicity of the untreated and treated samples was assessed by using the Microtox® bioassay.

Phase 2:

The supernatant generated during coagulation/flocculation treatment under the optimum conditions was used in the next step in this research. The supernatant was treated using CupriDyne™ system tablets (stoichiometric, 1:1, molecular ratio of $CuSO_4$ and KI particles) as oxidizing agent by generating iodine in water. The optimum conditions were determined based on the maximum total organic carbon (TOC) and ammonia ($NH_3$) removal. In this stage, the water quality parameters mentioned in Phase 1 were also determined.

Phase 3:

The sludge generated from coagulation/flocculation under optimum conditions was used in a leaching test. The sludge was dried and then washed with clean water. After a certain period of contact with the dried sludge, the water was collected and analyzed to test the leaching of nutrients and other elements.

Results and Discussions

Swine manure characteristics vary significantly depending on the several factors, including water consumption, on-site operation, seasonal conditions, and waste handing methods, among others. Table 1 summarizes the characteristics of the primary settled swine manure.

TABLE 1

Characteristics of swine manure supernatant

| Parameter | Supernatant | |
| --- | --- | --- |
| | Number of Runs | Mean |
| Total solids (mg/L) | 4 | 8,775 |
| Total suspended solids (mg/L) | 8 | 1,550 |
| Total dissolved solids (mg/L) | 4 | 7,390 |
| Total volatile solids (mg/L) | 4 | 5,750 |
| Total fixed solids (mg/L) | 4 | 3,025 |
| Density (g/L) | 4 | 976 |
| pH | 7 | 7.38 |
| Chemical oxygen demand (mg/L) | 5 | 8,485 |
| Total phosphorous (mg/L) | 3 | 211 |
| Total kjeldahl nitrogen (mg/L) | 3 | 2344 |
| Total coliform (CFU/100 mL) | 4 | $1.2 \times 10_6$ |

Sampling Oct. 06, 2009

Preliminary Settling

Preliminary settling has been described as an effective and economic liquid manure treatment processes. In this study, the raw fresh swine manure wastewater was allowed to settle prior to any treatment. It was found that the initial TSS decreased a 38% after 2.5 hours and 66% after 19 days of settling, as displayed in FIG. 1.

FIG. 1. Natural settling of liquid swine manure.

Determination of Speed and Mixing Time

It has been found that the most important factors affecting the performance of coagulation/flocculation process are: (1) water pH; (2) coagulation mixing intensity; (3) coagulation mixing time; (4) coagulant dose; (5) type of coagulant; (6) type of coagulant aid; (7) and dose of coagulant aid; (8) flocculation mixing intensity; and (9) flocculation time. From the preliminary test results, it was found that jar test performed at 200 rpm gave the maximum TSS removal using swine manure supernatant, diluted 5 times (FIG. 2). It was also fund that the combination of slow mixing and rapid mixing reported the lower TSS removal. FIG. 3 shows the effect of mixing time on the TSS removals. The results indicated that 81.6% of TSS was depleted using 5 minutes of rapid mixing at 200 rpm. Based on these results, the optimization of Phase 1 and Phase 2 were performed using 5 minutes of rapid mixing at 200 rpm.

FIG. 2. Effect of mixing speed on TSS removal. Experimental condition: dilution=1:5, $TSS_0$=470 mg/L, $pH_0$=7.78, $SAP_0$=0.5 mg/L.

FIG. 3. Effect of mixing time on TSS removal. Experimental condition: dilution=1:5, $TSS_0$=200 mg/L, $pH_0$=11.07, Speed=200 rpm, $SAP_0$=0.5 g/L Determination of Optimum Conditions Phase 1

The Phase 1 considered the use of CupriDyne™ superabsorbent polymer (SAP). The determination of optimum conditions was based on maximum total suspended solids removal during coagulation and flocculation. Different dilutions (1:1, 1:3, and 1:5 Cupridyne™ tablets to dry weight SAP) and pHs were tested to optimize the TSS removal. It was found the optimum TSS removal (32.8%) was achieved using 1.25 g/L SAP at pH 7.36, in experiments performed using supernatant without dilution (FIG. 4).

FIG. 4. TSS removal using supernatant without dilution. Experimental conditions: $TSS_0$=2300 mg/L, $pH_0$=7.36, speed: 200 rpm, mixing time=5 min. Similar tests were conducted using supernatant diluted 5 times. As displayed in FIG. 5, an 81.64% of the initial TSS was removed using 0.5 g/L SAP at pH 11. At natural pH, removals of 50.2% were recorded using 0.5 g/L SAP.

FIG. 5. TSS removal using supernatant diluted five times. Experimental conditions: $TSS_0$=313 mg/L, $pH_0$=11.01, speed: 200 rpm, mixing time=5 min.

Determination of Optimum Conditions Phase 2

The treated supernatant generated during coagulation/flocculation treatment under the optimum conditions was used in Phase 2. The supernatant was treated using CupriDyne™ system tablets as oxidizing agent. The optimum conditions were determined based on the maximum total organic carbon (TOC) and ammonia ($NH_3$) removal. From the experiments using supernatant without dilution, it was found a removal of 80% ammonia (initial concentration of 1486 mg/L N) using 40 mg/L of free iodine, as shown in FIG. 6. Under the same conditions, the TOC levels decreased a 78% (FIG. 7). Similar tests were performed using the diluted supernatant at pH 11. The results indicated a removal of 50% ammonia (initial concentration of 325 mg/L N) using 80 mg/L of free iodine, as displayed in FIG. 8. Under the same conditions, the TOC levels decreased a 77% (FIG. 9).

FIG. 6. Removal of ammonia using CupriDyne™ tables. Experimental conditions: dilution=1:1, $ammonia_0$=1436 mg/L N, $pH_0$=7.69, $SAP_0$=1.25 g/L FIG. 7. TOC Removal using CupriDyne™ tables. Experimental conditions: dilution=1:1, $TOC_0$=1732 mg/L C, $pH_0$=7.69, $SAP_0$=1.25 g/L.

FIG. 8. Reduction of ammonia using CupriDyne™ tables. Experimental conditions: dilution=1:5, $pH_0$=11.01, $ammonia_0$=325 mg/L N, $SAP_0$=0.5 g/L.

FIG. 9. TOC Removal using CupriDyne™ tables. Experimental conditions: dilution=1:5, $TOC_0$=509 mg/L C, $pH_0$=11.01, $SAP_0$=1.25 g/L.

Toxicity Analysis

The acute toxicity of samples before and after treatments was measured using the Microtox® bioassay. A model 500 Microtox® analyzer (Strategic Diagnostic Inc.) was used to measure the light emitted by the *photobacterium*. Microtox® 8% screening test protocol was used for the toxicity assessment of samples. The toxicity analysis was performed within 24 h after treatment and using 8% the initial sample concentrations. Positive controls for the Microtox® assay were carried out using phenol standards. As illustrated in FIG. 10, the acute toxicity was evaluated using different free iodine concentrations (after Phase 2). The toxicity of the untreated samples was found to inhibit the 93% of the *photobacterium*. It was noted a decrease of the toxicity (inhibition) with increasing iodine concentrations. An inhibition of 92% was observed using 40 mg/L free iodine in experiments using non-diluted supernatant.

For experiments using diluted supernatant, an increment of the *Vibrio fischeri* inhibition was observed with increasing free iodine levels. Control tests were conducted using free iodine solution in ultrapure water. It was found that free iodine was able reduce the luminescent bacteria, showing his effectiveness as disinfectant.

FIG. 10. Toxic effects of treated supernatant on *Vibrio fischeri*. Experimental conditions: dilution=1:1, $pH_0$=7.58, test: 8% screening test, Phase 2.

Summary of Results Phase 1 and Phase 2

Tables 2 and 3 show a summary of the characteristics of the supernatant and diluted supernatant after Phase 1 (SAP) and Phase 2 (Tablets).

TABLE 2

Characteristics of supernatant before and after treatment.

| Parameter | Raw Supernatant | After Phase 1 | After Phase 2 |
|---|---|---|---|
| TSS (mg/L) | 1217 | 840 | 690 |
| pH | 7.69 | 7.91 | 7.98 |
| Turbidity (NTU) | 459 | 370 | 172 |
| TOC mg/L C | 1858 | 1732 | 580 |
| Total Phosphorous | 310 | 296 | 286 |
| Ammonia | 1662 | 1486 | 304 |
| Total Coliform (CFU/100 mL) | $1.2 \times 10_6$ | $0.1 \times 10_6$ | $0.09 \times 10_6$ |
| % inhibition on *Vibrio fischeri* | 94.00 | 92.75 | 92.06 |

TABLE 3

Characteristics of diluted supernatant before and after treatment.

| Parameter | Raw Supernatant | After Phase 1 | After Phase 2 |
|---|---|---|---|
| TSS (mg/L) | 540 | 270 | 110 |
| pH | 10.87 | 10.79 | 10.69 |
| Turbidity | 211 | 202 | 100 |
| TOC mg/L C | 599 | 509 | 118 |
| Total Phosphorous | 217 | 138 | 69 |
| Ammonia | 329 | 325 | 163 |
| Total Coliform (CFU/100 mL) | 9225 | 6150 | None detected |
| % inhibition on *Vibrio fischeri* | 65.52 | 64.69 | 90.90 |

Leaching Results

The last phase of this study was designed to investigate the leaching of nutrients and other elements from the sludge generated after coagulation/flocculation, under optimum conditions. During the leaching test, the samples were withdrawn after 1, 6, 12, 24 and 48 hours.

Tables 4, 5, 6 and 7 display the results of the leaching tests for major ions.

Page 14

TABLE 4

Major ions during leaching test after treatment of non-diluted supernatant, Phase 1.

| | Phase 1 - 1 hr | Phase 1 - 6 hr | Phase 1 - 12 hr | Phase 1 - 24 hr | Phase 1 - 48 hr |
|---|---|---|---|---|---|
| Anions | | | | | |
| Chloride (mg/L) | 58.7 | 73.6 | 90.5 | 101.2 | 109.8 |
| Nitrite (mg/L) | n.a. | n.a. | n.a. | n.a. | n.a. |
| Nitrate (mg/L) | n.a. | n.a. | 0.08 | 7.1 | n.a. |
| Phosphate (mg/L) | 5.4 | 7.0 | 10.0 | n.a. | 19.9 |
| Sulfate (mg/L) | 9.1 | 10.7 | 15.7 | 17.2 | 21.8 |
| Cations | | | | | |
| Sodium (mg/L) | 17.2 | 21.8 | 28.1 | 32.9 | 40.0 |
| Ammonium (mg/L) | 11.1 | 13.9 | 15.6 | 17.8 | 21.7 |
| Potassium (mg/L) | 37.4 | 47.1 | 58.4 | 66.4 | 79.9 |
| Magnesium (mg/L) | 0.1 | 0.1 | 0.4 | 0.2 | 0.2 |
| Calcium (mg/L) | 1.2 | 1.4 | 2.7 | 2.7 | 5.0 |

TABLE 5

Major ions during leaching test after treatment of non-diluted supernatant, Phase 2.

|  | Phase 2 - 1 hr | Phase 2 - 6 hr | Phase 2 - 12 hr | Phase 2 - 24 hr | Phase 2 - 48 hr |
|---|---|---|---|---|---|
| Anions |  |  |  |  |  |
| Chloride (mg/L) | 61.1 | 61.5 | 63.6 | 64.6 | 66.8 |
| Nitrite (mg/L) | n.a. | n.a. | n.a. | n.a. | n.a. |
| Nitrate (mg/L) | n.a. | n.a. | n.a. | 0.07 | 0.04 |
| Phosphate (mg/L) | 12.8 | 13.1 | 13.1 | 13.4 | 15.8 |
| Sulphate (mg/L) | 15.1 | 15.3 | 15.7 | 17.9 | 17.9 |
| Cations |  |  |  |  |  |
| Sodium (mg/L) | 24.0 | 24.7 | 24.57 | 25.8 | 29.8 |
| Ammonium (mg/L) | 21.72 | 22.2 | 22.7 | 23.4 | 26.9 |
| Potassium (mg/L) | 38.4 | 39.2 | 40.2 | 42.0 | 47.2 |
| Magnesium (mg/L) | 0.6 | 0.4 | 0.47 | 0.4 | 0.5 |
| Calcium (mg/L) | 12.4 | 4.2 | 4.27 | 4.1 | 4.5 |

TABLE 6

Major ions during leaching test after treatment of diluted supernatant, Phase 1.

|  | Phase 1 - 1 hr | Phase 1 - 6 hr | Phase 1 - 12 hr | Phase 1 - 24 hr | Phase 1 - 48 hr |
|---|---|---|---|---|---|
| Anions |  |  |  |  |  |
| Chloride (mg/L) | 21.7 | 22.0 | 23.5 | 23.0 | 23.7 |
| Nitrite (mg/L) | n.a. | 0.02 | n.a. | 0.0109 | n.a. |
| Nitrate (mg/L) | n.a. | 0.03 | 0.07 | n.a. | 0.007 |
| Phosphate (mg/L) | 7.9 | 8.4 | 9.2 | 9.3 | 10.1 |
| Sulfate (mg/L) | 4.6 | 4.7 | 6.2 | 5.0 | 5.0 |
| Cations |  |  |  |  |  |
| Sodium (mg/L) | 135.1 | 140.4 | 147.5 | 150.4 | 157.4 |
| Ammonium (mg/L) | 0.04 | 0.6 | 0.7 | 0.9 | 1.3 |
| Potassium (mg/L) | 19.4 | 20.0 | 21.0 | 21.1 | 21.2 |
| Magnesium (mg/L) | 0.6 | 0.6 | 0.8 | 0.6 | 0.6 |
| Calcium (mg/L) | 2.7 | 3.4 | 2.88 | 2.6 | 2.5 |

TABLE 7

Major ions during leaching test after treatment of diluted supernatant, Phase 2.

|  | Phase 2 - 1 hr | Phase 2 - 6 hr | Phase 2 - 12 hr | Phase 2 - 24 hr | Phase 2 - 48 hr |
|---|---|---|---|---|---|
| Anions |  |  |  |  |  |
| Chloride (mg/L) | 10.8 | 10.9 | 11.4 | 11.5 | 11.05 |
| Nitrite (mg/L) | 0.04 | 0.003 | n.a. | 0.01 | 0.015 |
| Nitrate (mg/L) | n.a. | 0.06 | n.a. | 0.007 | 0.0055 |
| Phosphate (mg/L) | 5.9 | 7.9 | 8.8 | 9.1 | 10.35 |
| Sulfate (mg/L) | 10.8 | 11.8 | 12.7 | 11.8 | 11.95 |
| Cations |  |  |  |  |  |
| Sodium (mg/L) | 72.6 | 84.2 | 85.6 | 86.7 | 91.0 |
| Ammonium (mg/L) | 0.4 | 0.5 | 0.9 | 1.1 | 0.6 |
| Potassium (mg/L) | 15.0 | 16.7 | 17.2 | 17.45 | 17.7 |
| Magnesium (mg/L) | 0.4 | 0.6 | 0.6 | 0.5 | 0.5 |
| Calcium (mg/L) | 1.5 | 2.9 | 2.3 | 2.1 | 2.5 |

These results, in spite of being focused on animal waste treatment, which is in fact at least a hazardous of a waste environment, are clearly evidence of the performance of the compositions as antimicrobial treatments for large volumes of liquid waste materials.

Some of the general and specific technology described herein may include a method of moderating an environment in an area where oil extraction wastes are collected in a fluid containing volume (pond or lake) or compartment. The method may include:

a) collecting oil extraction waste in a fluid containing compartment, the extraction waste generating or providing in or above the fluid containing compartment at least one waste selected from the group consisting of carbon dioxide, hydrogen sulfide, ammonia, methane, mercaptans, hydrocarbons, bacteria and organic acids;

b) providing in the fluid containing compartment (either directly or from primary injection or pumping into the natural reservoir or formation from which the oil is being extracted) a combination of i) a polymer (e.g., with or without additives such as lubricant), especially a capable of absorbing at least ten times its weight in water and ii) a combination of salts that react to liberate $I_2$; and c) flocculating an at least one waste with liberated $I_2$ to form a flocculent with the polymer, iodine and waste.

The combination of salts used to provide the iodine may include cupric sulfate and potassium iodide. The polymer in the flocculent may be a hypertonic polymer comprising a superabsorbent polymer with ions from the combination of salts, especially iodine and copper. The polymer may preferably contain acrylic acid, methacrylic acid, acrylic acid salt and/or methacrylic acid salt moieties and may be a superabsorbent polymer.

In the method, the fluid containment compartment may be positioned below ground (it may be above ground as a pond, lake, pool, or tank), but this might require some significant pumping action to get the fluid and extraction waste to the above ground container) and extraction waste from animal housing is fed by gravity from the animal housing into the fluid containment compartment. The compartment may be an open tank, open pool, open storage pond, cement pool or metal pool or tank, or any other closed or open system that stores the wastes and liquids and does not allow the material to continually flow out of control. The compartment is positioned below ground and waste from the extraction reservoir is fed by gravity from the extraction location into the fluid containment compartment to the flocculent and wherein iodine in the fluid containment compartment reduces concentrations of odorous gases evaporating from the fluid in the fluid containing compartment. Usually the method is used where at least one waste is ammonia and the iodine binds ammonia into the polymer and the flocculent is removed from the fluid containment container and spread onto soil to provide agriculturally available nitrogen compounds for plant fertilizer. For example, at least one waste may be ammonia and the iodine binds ammonia into the polymer and the flocculent is removed from the fluid containment container and spread onto soil to provide agriculturally available nitrogen compounds for plant fertilizer, along with available carbon compounds in the waste. The method may also operate where at least one waste is carbon dioxide and the iodine binds carbon dioxide into the polymer and the flocculent is removed from the fluid containment container and spread onto soil to provide agriculturally available carbon compounds for plant fertilizer.

A product of the process might well be a flocculent that can be used as an anti-leaching fertilizer and soil hydration amendment. The flocculent would contain: i) a superabsorbent polymer, ii) water of hydration and iii) a residue of salts that have previously reacted to liberate $I_2$; and iii) at least some iodide entrapped in the flocculent with the polymer, with at least some iodide in the flocculent sequestering a waste material selected from the group consisting of carbon dioxide, hydrogen sulfide, ammonia, nitrates, nitrites, methane, mercaptans and organic acids. The flocculent would also have some extraction waste present in the flocculent, and these would have to be monitored to assure lack of agriculturally absorbed toxins. The flocculent would have the residue of salts present as at least 0.001% by weight of the superabsorbent polymer, and up to 50% by weight of the superabsorbent polymer. At least some of the waste material may have been oxidized. The flocculent contains agriculturally available nitrogen fertilizer therein.

What is claimed:

1. A method of moderating an environment in a hydrocarbon extraction process, the method comprising: a) adding liquid in sufficient amount to a natural formation of hydrocarbon-containing volume, the liquid comprising a superabsorbent polymer carrying $I_2$ or a superabsorbent polymer in combination with materials that react in the presence of water or alcohol to generate $I_2$ that is at least in part carried within the superabsorbent polymer; b) withdrawing hydrocarbon from the natural formation; and c) allowing at least some superabsorbent polymer carrying ionically bound $I_2$ to remain within the volume to moderate bacterial growth within the volume, wherein all polymer in the liquid consists essentially of the superabsorbent polymer.

2. A method of moderating an environment in a hydrocarbon extraction process, the method comprising: a) adding liquid in sufficient amount to a natural formation of hydrocarbon-containing volume, the liquid comprising superabsorbent polymer ionically binding $I_2$ or a superabsorbent polymer in combination with materials that react in the presence of water or alcohol to generate $I_2$ that is at least in part carried within the superabsorbent polymer; b) withdrawing hydrocarbon from the natural formation along with a portion of superabsorbent polymer having $I_2$ ionically bonded within the superabsorbent polymer; and c) allowing at least some polymer with ionically bound $I_2$ to remain within the volume to moderate bacterial growth within the volume.

3. The method of claim 2 wherein at least some of the generated $I_2$ is ionically bound to the superabsorbent polymer.

4. The method of claim 3 wherein at least some $I_2$ is formed in the presence of the superabsorbent polymer by reacting a combination of materials in the presence of water or alcohol to generate $I_2$ that is ionically bound to the superabsorbent polymer.

5. The method of claim 2 further comprising withdrawing at least a portion of the water added to the natural formation of hydrocarbon-containing volume along with at least some hydrocarbon.

6. The method of claim 5 wherein at least some of the generated $I_2$ is ionically bound to the superabsorbent polymer.

7. The method of claim 6 wherein at least some $I_2$ is formed in the presence of the superabsorbent polymer by reacting a combination of materials in the presence of water or alcohol to generate $I_2$ that is ionically bound to the superabsorbent polymer.

8. The method of claim 5 further comprising removing a portion of the at least some hydrocarbon along with water withdrawn to provide a waste liquid residue containing $I_2$.

9. The method of claim 5 wherein at least some $I_2$ is formed in the presence of the superabsorbent polymer by reacting a combination of materials in the presence of water or alcohol to generate $I_2$ that is ionically bound to the superabsorbent polymer.

10. The method of claim 5 wherein in addition to the superabsorbent polymer, an acid is present with the liquid to maintain the liquid at a pH below 7 and above 5.5.

11. The method of claim 2 wherein at least some I.sub.2 is formed in the presence of the superabsorbent polymer by reacting a combination of materials in the presence of water or alcohol to generate $I_2$, at least some of which $I_2$, binds To the superabsorbent polymer.

12. The method of claim 2 wherein at least some of the waste liquid residue comprises at least one additional waste selected from the group consisting of hydrogen sulfide, ammonia, bacteria, mercaptans and organic acids, and from the added liquid reduces emissions or growth of at least one of the additional wastes.

13. The method of claim 2 wherein in addition to the superabsorbent polymer, an acid is present with the liquid to maintain the liquid at a pH below 7 and above 5.5.

14. A method of moderating an environment in an area where liquid wastes are collected from a hydrocarbon extraction process, the method comprising: a) adding liquid in sufficient amount to a natural formation of underground hydrocarbon-containing volume; b) withdrawing at least a portion of the liquid added to the natural formation of hydrocarbon-containing volume along with at least some hydrocarbon; c) removing a portion of the at least some hydrocarbon oil to leave a waste liquid residue; and d) adding a superabsorbent polymer comprising ionically bound $I_2$ to the waste liquid residue to moderate bacterial growth within the waste liquid residue.

15. The method of claim 14 wherein the polymer comprises an acrylic superabsorbent polymer.

16. The method of claim 15 wherein at least some of the generated $I_2$ is ionically bound to the superabsorbent polymer.

17. The method of claim 16 wherein the superabsorbent polymetr has bound therein a combination of cupric sulfate and potassium iodide.

18. The method of claim 15 wherein at least some waste liquid residue with superabsorbent polymer with $I_2$ is returned to the volume to moderate bacterial growth within the volume.

19. The method of claim 18 wherein additional liquid is added to the waste liquid residue to form flow back liquid and the flow back liquid is returned to the volume.

20. The method of claim 19 wherein at least some of the generated $I_2$ is ionically bound to the superabsorbent polymer.

21. The method of claim 20 wherein the superabsorbent polymer with ionically bound flocculates and captures at least one additional waste material.

22. The method of claim 21 wherein the liquid waste comprises a hydrocarbon oil-containing volume which contains oil sands.

23. The method of claim 19 wherein a superabsorbent polymer with ionically bound $I_2$ is added to the additional liquid prior to or while the flow back liquid is returned to the volume.

24. The method of claim 18 wherein at least some of the generated $I_2$ is ionically bound to the superabsorbent polymer.

25. The method of claim 24 wherein the superabsorbent polymetr has bound therein a combination of cupric sulfate and potassium iodide.

26. The method of claim 14 wherein in addition to the superabsorbent polymer, an acid is present with the liquid to maintain the liquid at a pH below 7 and above 5.5.

27. The method of claim 14 wherein at least some of the waste liquid residue comprises at least one additional waste selected from the group consisting of hydrogen sulfide, ammonia, bacteria, mercaptans and organic acids, and from the added liquid reduces emissions or growth of at least one of the additional wastes.

28. The method of claim 27 wherein the superabsorbent polymer with ionically bound flocculates and captures at least one additional waste material.

29. The method of claim 27 wherein the polymer in the flocculent comprises a hypertonic polymer comprising the superabsorbent polymer with ionically bound iodine and ions from a combination of cupric sulfate and potassium iodide salts.

30. The method of claim 29 wherein the superabsorbent polymer comprises acrylic acid, methacrylic acid, acrylic acid salt and/or methacrylic acid salt moieties with ionically bound iodine.

31. The method of claim 14 wherein the liquid waste comprises a hydrocarbon oil-containing volume which contains oil sands.

\* \* \* \* \*